US010175037B2

(12) United States Patent
Ditte et al.

(10) Patent No.: US 10,175,037 B2
(45) Date of Patent: Jan. 8, 2019

(54) 3-D MEASURING DEVICE WITH BATTERY PACK

(71) Applicant: FARO Technologies, Inc., Lake Mary, FL (US)

(72) Inventors: Andreas Ditte, Ludwigsburg (DE); Andreas Woloschyn, Stuttgart (DE)

(73) Assignee: FARO TECHNOLOGIES, INC., Lake Mary, FL (US)

(*) Notice: Subject to any disclaimer, the term of this patent is extended or adjusted under 35 U.S.C. 154(b) by 0 days.

(21) Appl. No.: 15/386,785

(22) Filed: Dec. 21, 2016

(65) Prior Publication Data

US 2017/0184394 A1 Jun. 29, 2017

(30) Foreign Application Priority Data

Dec. 27, 2015 (DE) .................... 10 2015 122 844

(51) Int. Cl.
*G01B 11/00* (2006.01)
*H01M 2/10* (2006.01)
(Continued)

(52) U.S. Cl.
CPC .......... *G01B 11/002* (2013.01); *G01C 15/002* (2013.01); *G01S 7/4813* (2013.01); *G01S 17/42* (2013.01); *H01M 2/1055* (2013.01)

(58) Field of Classification Search
CPC .................................................... G01B 11/002
(Continued)

(56) References Cited

U.S. PATENT DOCUMENTS 1,535,312 A 4/1925 Hosking
1,538,758 A 5/1925 Taylor
(Continued)

FOREIGN PATENT DOCUMENTS

AT 506110 A1 6/2009
AT 508635 A1 3/2011
(Continued)

OTHER PUBLICATIONS

Great Britain Search Report for Application No. GB1622190.5 dated Jun. 23, 2017; 3 pgs.
(Continued)

*Primary Examiner* — Tarifur Chowdhury
*Assistant Examiner* — Omar Nixon
(74) *Attorney, Agent, or Firm* — Cantor Colburn LLP

(57) ABSTRACT

A 3D measurement device for optically scanning and measuring an environment is provided. The device includes a measuring head having a light emitter which emits an emission light beam, a light receiver and a control and evaluation device. The light receiver receives a reception light beam that is reflected or otherwise scattered by an object in the environment of the 3D measurement device. The control and evaluation device determines at least the distance from the object for each of a plurality of measuring points. A battery pack is removably coupled to the measuring head. The battery pack includes a battery housing and a plurality of individual batteries that are circular in cross-section. The plurality of individual batteries are arranged in a plurality of rows that define a row direction. The plurality of rows include a first row offset from a second row by one-half a diameter of the individual batteries.

9 Claims, 9 Drawing Sheets

(51) Int. Cl.
  *G01C 15/00* (2006.01)
  *G01S 17/42* (2006.01)
  *G01S 7/481* (2006.01)
(58) Field of Classification Search
  USPC .................................................... 356/625
  See application file for complete search history.

(56) References Cited

U.S. PATENT DOCUMENTS

| | | | |
|---|---|---|---|
| 1,918,813 A | 7/1933 | Kinzy | |
| 2,316,573 A | 4/1943 | Egy | |
| 2,333,243 A | 11/1943 | Glab | |
| 2,748,926 A | 6/1956 | Leahy | |
| 2,983,367 A | 6/1958 | Paramater et al. | |
| 2,924,495 A | 9/1958 | Haines | |
| 2,966,257 A | 12/1960 | Littlejohn | |
| 3,945,729 A | 3/1976 | Rosen | |
| 4,340,008 A | 7/1982 | Mendelson | |
| 4,379,461 A | 4/1983 | Nilsson et al. | |
| 4,424,899 A | 1/1984 | Rosenberg | |
| 4,430,796 A | 2/1984 | Nakagawa | |
| 4,457,625 A | 7/1984 | Greenleaf et al. | |
| 4,506,448 A | 3/1985 | Topping et al. | |
| 4,659,280 A | 4/1987 | Akeel | |
| 4,663,852 A | 5/1987 | Guarini | |
| 4,664,588 A | 5/1987 | Newell et al. | |
| 4,676,002 A | 6/1987 | Slocum | |
| 4,714,339 A | 12/1987 | Lau et al. | |
| 4,767,257 A | 8/1988 | Kato | |
| 4,790,651 A | 12/1988 | Brown et al. | |
| 4,882,806 A | 11/1989 | Davis | |
| 4,954,952 A | 9/1990 | Ubhayakar et al. | |
| 4,996,909 A | 3/1991 | Vache et al. | |
| 4,999,491 A | 3/1991 | Semler et al. | |
| 5,025,966 A | 6/1991 | Potter | |
| 5,027,951 A | 7/1991 | Johnson | |
| 5,069,524 A | 12/1991 | Watanabe et al. | |
| 5,168,532 A | 12/1992 | Seppi et al. | |
| 5,189,797 A | 3/1993 | Granger | |
| 5,205,111 A | 4/1993 | Johnson | |
| 5,211,476 A | 5/1993 | Coudroy | |
| 5,216,479 A | 6/1993 | Dotan et al. | |
| 5,218,427 A | 6/1993 | Koch | |
| 5,239,855 A | 8/1993 | Schleifer et al. | |
| 5,289,264 A | 2/1994 | Steinbichler | |
| 5,289,265 A | 2/1994 | Inoue et al. | |
| 5,313,261 A | 5/1994 | Leatham et al. | |
| 5,319,445 A | 6/1994 | Fitts | |
| 5,329,347 A | 7/1994 | Wallace et al. | |
| 5,329,467 A | 7/1994 | Nagamune et al. | |
| 5,332,315 A | 7/1994 | Baker et al. | |
| 5,337,149 A | 8/1994 | Kozah et al. | |
| 5,371,347 A | 12/1994 | Plesko | |
| 5,372,250 A | 12/1994 | Johnson | |
| 5,373,346 A | 12/1994 | Hocker | |
| 5,402,365 A | 3/1995 | Kozikaro et al. | |
| 5,402,582 A | 4/1995 | Raab | |
| 5,412,880 A | 5/1995 | Raab | |
| 5,416,505 A | 5/1995 | Eguchi et al. | |
| 5,430,384 A | 7/1995 | Hocker | |
| 5,446,846 A | 8/1995 | Lennartsson | |
| 5,455,670 A | 10/1995 | Payne et al. | |
| 5,510,977 A | 4/1996 | Raab | |
| 5,517,297 A | 5/1996 | Stenton | |
| 5,528,505 A | 6/1996 | Granger et al. | |
| 5,535,524 A | 7/1996 | Carrier et al. | |
| 5,675,326 A | 10/1997 | Juds et al. | |
| 5,677,760 A | 10/1997 | Mikami et al. | |
| 5,682,508 A | 10/1997 | Hocker, III | |
| 5,716,036 A | 2/1998 | Isobe et al. | |
| 5,724,264 A | 3/1998 | Rosenberg et al. | |
| 5,752,112 A | 5/1998 | Paddock et al. | |
| 5,754,449 A | 5/1998 | Hoshal et al. | |
| 5,762,512 A * | 6/1998 | Trant | H01M 2/1055 320/114 |
| 5,768,792 A | 6/1998 | Raab | |
| 5,793,993 A | 8/1998 | Broedner et al. | |
| 5,804,805 A | 9/1998 | Koenck et al. | |
| 5,825,666 A | 10/1998 | Freifeld | |
| 5,829,148 A | 11/1998 | Eaton | |
| 5,832,416 A | 11/1998 | Anderson | |
| 5,844,591 A | 12/1998 | Takamatsu et al. | |
| 5,856,874 A | 1/1999 | Tachibana et al. | |
| 5,887,122 A | 3/1999 | Terawaki et al. | |
| 5,894,123 A | 4/1999 | Ohtomo et al. | |
| 5,909,939 A | 6/1999 | Fugmann | |
| 5,926,782 A | 7/1999 | Raab | |
| 5,933,267 A | 8/1999 | Ishizuka | |
| 5,936,721 A | 8/1999 | Ohtomo et al. | |
| 5,940,170 A | 8/1999 | Berg et al. | |
| 5,940,181 A | 8/1999 | Tsubono et al. | |
| 5,949,530 A | 9/1999 | Wetteborn | |
| 5,956,857 A | 9/1999 | Raab | |
| 5,969,321 A | 10/1999 | Danielson et al. | |
| 5,973,788 A | 10/1999 | Pettersen et al. | |
| 5,978,748 A | 11/1999 | Raab | |
| 5,983,936 A | 11/1999 | Schwieterman et al. | |
| 5,988,862 A | 11/1999 | Kacyra et al. | |
| 5,991,011 A | 11/1999 | Damm | |
| 5,996,790 A | 12/1999 | Yamada et al. | |
| 5,997,779 A | 12/1999 | Potter | |
| 6,040,898 A | 3/2000 | Mrosik et al. | |
| D423,534 S | 4/2000 | Raab et al. | |
| 6,050,615 A | 4/2000 | Weinhold | |
| 6,057,915 A | 5/2000 | Squire et al. | |
| 6,060,889 A | 5/2000 | Hocker | |
| 6,067,116 A | 5/2000 | Yamano et al. | |
| 6,069,700 A | 5/2000 | Rudnick et al. | |
| 6,077,306 A | 6/2000 | Metzger et al. | |
| 6,112,423 A | 9/2000 | Sheehan | |
| 6,115,511 A | 9/2000 | Sakai et al. | |
| 6,125,337 A | 9/2000 | Rosenberg et al. | |
| 6,131,299 A | 10/2000 | Raab et al. | |
| 6,134,507 A | 10/2000 | Markey, Jr. et al. | |
| 6,138,915 A | 10/2000 | Danielson et al. | |
| 6,149,112 A | 11/2000 | Thieltges | |
| 6,151,789 A | 11/2000 | Raab et al. | |
| 6,163,294 A | 12/2000 | Talbot | |
| 6,166,504 A | 12/2000 | Iida et al. | |
| 6,166,809 A | 12/2000 | Pettersen et al. | |
| 6,166,811 A | 12/2000 | Long et al. | |
| 6,204,651 B1 | 3/2001 | Marcus et al. | |
| 6,204,961 B1 | 3/2001 | Anderson et al. | |
| 6,219,928 B1 | 4/2001 | Raab et al. | |
| D441,632 S | 5/2001 | Raab et al. | |
| 6,240,651 B1 | 6/2001 | Schroeder et al. | |
| 6,253,458 B1 | 7/2001 | Raab et al. | |
| 6,282,195 B1 | 8/2001 | Miller et al. | |
| 6,285,390 B1 | 9/2001 | Blake | |
| 6,298,569 B1 | 10/2001 | Raab et al. | |
| 6,339,410 B1 | 1/2002 | Milner et al. | |
| 6,349,249 B1 | 2/2002 | Cunningham | |
| 6,366,831 B1 | 4/2002 | Raab | |
| 6,408,252 B1 | 6/2002 | De Smet | |
| 6,418,774 B1 | 7/2002 | Brogaardh et al. | |
| 6,438,507 B1 | 8/2002 | Imai | |
| 6,438,856 B1 | 8/2002 | Kaczynski | |
| 6,442,419 B1 | 8/2002 | Chu et al. | |
| 6,445,446 B1 | 9/2002 | Kumagai et al. | |
| 6,460,004 B2 | 10/2002 | Greer et al. | |
| 6,470,584 B1 | 10/2002 | Stoodley | |
| 6,477,784 B2 | 11/2002 | Schroeder et al. | |
| 6,480,270 B1 | 11/2002 | Studnicka et al. | |
| 6,483,106 B1 | 11/2002 | Ofitomo et al. | |
| 6,497,394 B1 | 12/2002 | Dunchock | |
| 6,504,602 B1 | 1/2003 | Hinderling | |
| 6,512,575 B1 | 1/2003 | Marchi | |
| 6,519,860 B1 | 2/2003 | Bieg et al. | |
| D472,824 S | 4/2003 | Raab et al. | |
| 6,547,397 B1 | 4/2003 | Kaufman et al. | |
| 6,598,306 B2 | 7/2003 | Eaton | |
| 6,611,346 B2 | 8/2003 | Granger | |
| 6,611,617 B1 | 8/2003 | Crampton | |
| D479,544 S | 9/2003 | Raab et al. | |

(56) References Cited

U.S. PATENT DOCUMENTS

| | | |
|---|---|---|
| 6,612,044 B2 | 9/2003 | Raab et al. |
| 6,621,065 B1 | 9/2003 | Fukumoto et al. |
| 6,626,339 B2 | 9/2003 | Gates et al. |
| 6,633,051 B1 | 10/2003 | Holloway et al. |
| 6,649,208 B2 | 11/2003 | Rodgers |
| 6,650,402 B2 | 11/2003 | Sullivan et al. |
| 6,668,466 B1 | 12/2003 | Bieg et al. |
| 6,675,122 B1 | 1/2004 | Markendorf et al. |
| 6,681,495 B2 | 1/2004 | Masayuki et al. |
| 6,710,859 B2 | 3/2004 | Shirai et al. |
| D490,831 S | 6/2004 | Raab et al. |
| D491,210 S | 6/2004 | Raab et al. |
| 6,750,873 B1 | 6/2004 | Bernardini et al. |
| 6,753,876 B2 | 6/2004 | Brooksby et al. |
| 6,759,649 B2 | 7/2004 | Hipp |
| 6,759,979 B2 | 7/2004 | Vashisth et al. |
| 6,764,185 B1 | 7/2004 | Beardsley et al. |
| 6,789,327 B2 | 9/2004 | Roth et al. |
| 6,820,346 B2 | 11/2004 | Raab et al. |
| 6,822,749 B1 | 11/2004 | Christoph |
| 6,825,923 B2 | 11/2004 | Hamar et al. |
| 6,826,664 B2 | 11/2004 | Hocker, III et al. |
| 6,847,436 B2 | 1/2005 | Bridges |
| 6,856,381 B2 | 2/2005 | Christoph |
| 6,858,836 B1 | 2/2005 | Hartrumpf |
| 6,859,269 B2 | 2/2005 | Ohtomo et al. |
| 6,862,097 B2 | 3/2005 | Yanagisawa et al. |
| 6,868,359 B2 | 3/2005 | Raab |
| 6,879,933 B2 | 4/2005 | Steffey et al. |
| 6,889,903 B1 | 5/2005 | Koenck |
| 6,892,465 B2 | 5/2005 | Raab et al. |
| 6,894,767 B2 | 5/2005 | Ishinabe et al. |
| 6,895,347 B2 | 5/2005 | Dorny et al. |
| 6,901,673 B1 | 6/2005 | Cobb et al. |
| 6,904,691 B2 | 6/2005 | Raab et al. |
| 6,914,678 B1 | 7/2005 | Ulrichsen et al. |
| 6,917,415 B2 | 7/2005 | Gogolla et al. |
| 6,920,697 B2 | 7/2005 | Raab et al. |
| 6,925,722 B2 | 8/2005 | Raab et al. |
| 6,931,745 B2 | 8/2005 | Granger |
| 6,935,748 B2 | 8/2005 | Kaufman et al. |
| 6,948,255 B2 | 9/2005 | Russell |
| 6,965,843 B2 | 11/2005 | Raab et al. |
| 7,003,892 B2 | 2/2006 | Eaton et al. |
| 7,006,084 B1 | 2/2006 | Buss et al. |
| 7,024,032 B2 | 4/2006 | Kidd et al. |
| 7,029,126 B2 | 4/2006 | Tang |
| 7,032,321 B2 | 4/2006 | Raab et al. |
| 7,040,136 B2 | 5/2006 | Forss et al. |
| 7,051,447 B2 | 5/2006 | Kikuchi et al. |
| 7,069,124 B1 | 6/2006 | Whittaker et al. |
| 7,069,875 B2 | 7/2006 | Warecki |
| 7,076,420 B1 | 7/2006 | Snyder et al. |
| 7,106,421 B2 | 9/2006 | Matsuura et al. |
| 7,117,107 B2 | 10/2006 | Dorny et al. |
| 7,120,092 B2 | 10/2006 | Del Prado Pavon et al. |
| 7,127,822 B2 | 10/2006 | Kumagai et al. |
| 7,136,153 B2 | 11/2006 | Mori et al. |
| 7,140,213 B2 | 11/2006 | Feucht et al. |
| 7,142,289 B2 | 11/2006 | Ando et al. |
| 7,145,926 B2 | 12/2006 | Vitruk et al. |
| 7,152,456 B2 | 12/2006 | Eaton |
| 7,174,651 B2 | 2/2007 | Raab et al. |
| 7,180,072 B2 | 2/2007 | Persi et al. |
| 7,184,047 B1 | 2/2007 | Crampton |
| 7,190,465 B2 | 3/2007 | Froehlich et al. |
| 7,191,541 B1 | 3/2007 | Weekers et al. |
| 7,193,690 B2 | 3/2007 | Ossig et al. |
| 7,196,509 B2 | 3/2007 | Teng |
| 7,199,872 B2 | 4/2007 | Van Cranenbroeck |
| 7,200,246 B2 | 4/2007 | Cofer et al. |
| 7,230,689 B2 | 6/2007 | Lau |
| 7,242,590 B1 | 7/2007 | Yeap et al. |
| 7,249,421 B2 | 7/2007 | MacManus et al. |
| 7,256,899 B1 | 8/2007 | Faul et al. |
| 7,269,910 B2 | 9/2007 | Raab et al. |
| D551,943 S | 10/2007 | Hodjat et al. |
| 7,285,793 B2 | 10/2007 | Husted |
| 7,296,364 B2 | 11/2007 | Seitz et al. |
| 7,296,955 B2 | 11/2007 | Dreier |
| 7,296,979 B2 | 11/2007 | Raab et al. |
| 7,306,339 B2 | 12/2007 | Kaufman et al. |
| 7,307,701 B2 | 12/2007 | Hoffman, II |
| 7,312,862 B2 | 12/2007 | Zumbrunn et al. |
| 7,313,264 B2 | 12/2007 | Crampton |
| D559,657 S | 1/2008 | Wohlford et al. |
| 7,319,512 B2 | 1/2008 | Ohtomo et al. |
| 7,330,242 B2 | 2/2008 | Reichert et al. |
| 7,337,344 B2 | 2/2008 | Barman et al. |
| 7,348,822 B2 | 3/2008 | Baer |
| 7,352,446 B2 | 4/2008 | Bridges et al. |
| 7,360,648 B1 | 4/2008 | Blaschke |
| 7,372,558 B2 | 5/2008 | Kaufman et al. |
| 7,372,581 B2 | 5/2008 | Raab et al. |
| 7,383,638 B2 | 6/2008 | Granger |
| 7,388,654 B2 | 6/2008 | Raab et al. |
| 7,389,870 B2 | 6/2008 | Slappay |
| 7,395,606 B2 | 7/2008 | Crampton |
| 7,400,384 B1 | 7/2008 | Evans et al. |
| 7,430,068 B2 | 9/2008 | Becker et al. |
| 7,430,070 B2 | 9/2008 | Soreide et al. |
| 7,432,686 B2 | 10/2008 | Erdman et al. |
| 7,441,341 B2 | 10/2008 | Eaton |
| 7,447,931 B1 | 11/2008 | Rischar et al. |
| 7,449,876 B2 | 11/2008 | Pleasant et al. |
| 7,454,265 B2 | 11/2008 | Marsh |
| 7,463,368 B2 | 12/2008 | Morden et al. |
| 7,477,359 B2 | 1/2009 | England et al. |
| 7,480,037 B2 | 1/2009 | Palmateer et al. |
| 7,508,496 B2 | 3/2009 | Mettenleiter et al. |
| 7,508,971 B2 | 3/2009 | Vaccaro et al. |
| 7,515,256 B2 | 4/2009 | Ohtomo et al. |
| 7,525,276 B2 | 4/2009 | Eaton |
| 7,527,205 B2 | 5/2009 | Zhu et al. |
| 7,528,768 B2 | 5/2009 | Wakayama et al. |
| 7,541,830 B2 | 6/2009 | Fahrbach et al. |
| 7,545,517 B2 | 6/2009 | Rueb et al. |
| 7,546,689 B2 | 6/2009 | Ferrari et al. |
| 7,551,771 B2 | 6/2009 | England, III |
| 7,552,644 B2 | 6/2009 | Haase et al. |
| 7,557,824 B2 | 7/2009 | Holliman |
| 7,561,598 B2 | 7/2009 | Stratton et al. |
| 7,564,250 B2 | 7/2009 | Hocker |
| 7,568,293 B2 | 8/2009 | Ferrari |
| 7,578,069 B2 | 8/2009 | Eaton |
| D599,226 S | 9/2009 | Gerent et al. |
| 7,589,595 B2 | 9/2009 | Cutler |
| 7,589,825 B2 | 9/2009 | Orchard et al. |
| 7,591,077 B2 | 9/2009 | Pettersson |
| 7,591,078 B2 | 9/2009 | Crampton |
| 7,599,106 B2 | 10/2009 | Matsumoto et al. |
| 7,600,061 B2 | 10/2009 | Honda |
| 7,602,873 B2 | 10/2009 | Eidson |
| 7,604,207 B2 | 10/2009 | Hasloecher et al. |
| 7,610,175 B2 | 10/2009 | Eidson |
| 7,614,157 B2 | 11/2009 | Granger |
| 7,624,510 B2 | 12/2009 | Ferrari |
| 7,625,335 B2 | 12/2009 | Deichmann et al. |
| 7,626,690 B2 | 12/2009 | Kumagai et al. |
| D607,350 S | 1/2010 | Cooduvalli et al. |
| 7,656,751 B2 | 2/2010 | Rischar et al. |
| 7,659,995 B2 | 2/2010 | Knighton et al. |
| D610,926 S | 3/2010 | Gerent et al. |
| 7,693,325 B2 | 4/2010 | Pulla et al. |
| 7,701,592 B2 | 4/2010 | Saint Clair et al. |
| 7,712,224 B2 | 5/2010 | Hicks |
| 7,721,396 B2 | 5/2010 | Fleischman |
| 7,728,833 B2 | 6/2010 | Verma et al. |
| 7,728,963 B2 | 6/2010 | Kirschner |
| 7,735,234 B2 | 6/2010 | Briggs et al. |
| 7,743,524 B2 | 6/2010 | Eaton et al. |
| 7,752,003 B2 | 7/2010 | MacManus |
| 7,756,615 B2 | 7/2010 | Barfoot et al. |
| 7,765,707 B2 | 8/2010 | Tomelleri |

(56) References Cited

U.S. PATENT DOCUMENTS

| | | | |
|---|---|---|---|
| 7,769,559 B2 | 8/2010 | Reichert | |
| 7,774,949 B2 | 8/2010 | Ferrari | |
| 7,779,548 B2 | 8/2010 | Ferrari | |
| 7,779,553 B2 | 8/2010 | Jordil et al. | |
| 7,784,194 B2 | 8/2010 | Raab et al. | |
| 7,787,670 B2 | 8/2010 | Urushiya | |
| 7,793,425 B2 | 9/2010 | Bailey | |
| 7,798,453 B2 | 9/2010 | Maningo et al. | |
| 7,800,758 B1 | 9/2010 | Bridges et al. | |
| 7,804,602 B2 | 9/2010 | Raab | |
| 7,805,851 B2 | 10/2010 | Pettersson | |
| 7,805,854 B2 | 10/2010 | Eaton | |
| 7,809,518 B2 | 10/2010 | Zhu et al. | |
| 7,834,985 B2 | 11/2010 | Morcom | |
| 7,847,922 B2 | 12/2010 | Gittinger et al. | |
| 7,858,219 B2 * | 12/2010 | Agehara | B25F 5/02 173/13 |
| RE42,055 E | 1/2011 | Raab | |
| RE42,082 E | 2/2011 | Raab et al. | |
| 7,881,896 B2 | 2/2011 | Atwell et al. | |
| 7,889,324 B2 | 2/2011 | Yamamoto | |
| 7,900,714 B2 | 3/2011 | Milbourne et al. | |
| 7,903,245 B2 | 3/2011 | Miousset et al. | |
| 7,903,261 B2 | 3/2011 | Saint Clair et al. | |
| 7,908,757 B2 | 3/2011 | Ferrari | |
| 7,935,928 B2 | 5/2011 | Serger et al. | |
| 7,965,747 B2 | 6/2011 | Kumano | |
| D643,319 S | 8/2011 | Ferrari et al. | |
| 7,990,397 B2 | 8/2011 | Bukowski et al. | |
| 7,994,465 B1 | 8/2011 | Bamji et al. | |
| 7,995,834 B1 | 8/2011 | Knighton et al. | |
| 8,001,697 B2 | 8/2011 | Danielson et al. | |
| 8,020,657 B2 | 9/2011 | Allard et al. | |
| 8,022,812 B2 | 9/2011 | Beniyama et al. | |
| 8,028,432 B2 | 10/2011 | Bailey et al. | |
| 8,036,775 B2 | 10/2011 | Matsumoto et al. | |
| 8,045,762 B2 | 10/2011 | Otani et al. | |
| 8,051,710 B2 | 11/2011 | Van Dam et al. | |
| 8,052,857 B2 | 11/2011 | Townsend | |
| 8,064,046 B2 | 11/2011 | Ossig et al. | |
| 8,065,861 B2 | 11/2011 | Caputo | |
| 8,082,673 B2 | 12/2011 | Desforges et al. | |
| 8,099,877 B2 | 1/2012 | Champ | |
| 8,117,668 B2 | 2/2012 | Crampton et al. | |
| 8,123,350 B2 | 2/2012 | Cannell et al. | |
| 8,152,071 B2 | 4/2012 | Doherty et al. | |
| D659,035 S | 5/2012 | Ferrari et al. | |
| 8,171,650 B2 | 5/2012 | York et al. | |
| 8,179,936 B2 | 5/2012 | Bueche et al. | |
| D662,427 S | 6/2012 | Bailey et al. | |
| 8,218,131 B2 | 7/2012 | Otani et al. | |
| 8,260,483 B2 | 9/2012 | Barfoot et al. | |
| 8,269,984 B2 | 9/2012 | Hinderling et al. | |
| 8,276,286 B2 | 10/2012 | Bailey et al. | |
| 8,284,407 B2 | 10/2012 | Briggs et al. | |
| 8,310,653 B2 | 11/2012 | Ogawa et al. | |
| 8,321,612 B2 | 11/2012 | Hartwich et al. | |
| 8,346,480 B2 | 1/2013 | Trepagnier et al. | |
| 8,352,212 B2 | 1/2013 | Fetter et al. | |
| D676,341 S | 2/2013 | Bailey et al. | |
| 8,381,704 B2 | 2/2013 | Debelak et al. | |
| 8,384,914 B2 | 2/2013 | Becker et al. | |
| D678,085 S | 3/2013 | Bailey et al. | |
| 8,391,565 B2 | 3/2013 | Purcell et al. | |
| 8,533,967 B2 | 9/2013 | Bailey et al. | |
| 8,537,374 B2 | 9/2013 | Briggs et al. | |
| 8,619,265 B2 | 12/2013 | Steffey et al. | |
| 8,645,022 B2 | 2/2014 | Yoshimura et al. | |
| 8,677,643 B2 | 3/2014 | Bridges et al. | |
| 9,113,023 B2 | 8/2015 | Bridges et al. | |
| 2001/0004269 A1 | 6/2001 | Shibata et al. | |
| 2002/0032541 A1 | 3/2002 | Raab et al. | |
| 2002/0059042 A1 | 5/2002 | Kacyra et al. | |
| 2002/0087233 A1 | 7/2002 | Raab | |
| 2002/0128790 A1 | 9/2002 | Woodmansee | |
| 2002/0143506 A1 | 10/2002 | D'Aligny et al. | |
| 2002/0149694 A1 | 10/2002 | Seo | |
| 2002/0170192 A1 | 11/2002 | Steffey et al. | |
| 2002/0176097 A1 | 11/2002 | Rodgers | |
| 2003/0002055 A1 | 1/2003 | Kilthau et al. | |
| 2003/0033104 A1 | 2/2003 | Gooche | |
| 2003/0043386 A1 | 3/2003 | Froehlich et al. | |
| 2003/0053037 A1 | 3/2003 | Blaesing-Bangert et al. | |
| 2003/0090646 A1 | 5/2003 | Riegl et al. | |
| 2003/0125901 A1 | 7/2003 | Steffey et al. | |
| 2003/0137449 A1 | 7/2003 | Vashisth et al. | |
| 2003/0142631 A1 | 7/2003 | Silvester | |
| 2003/0167647 A1 | 9/2003 | Raab et al. | |
| 2003/0172536 A1 | 9/2003 | Raab et al. | |
| 2003/0172537 A1 | 9/2003 | Raab et al. | |
| 2003/0179361 A1 | 9/2003 | Ohtomo et al. | |
| 2003/0208919 A1 | 11/2003 | Raab et al. | |
| 2003/0221326 A1 | 12/2003 | Raab et al. | |
| 2004/0004727 A1 | 1/2004 | Yanagisawa et al. | |
| 2004/0022416 A1 | 2/2004 | Lemelson et al. | |
| 2004/0027554 A1 | 2/2004 | Ishinabe et al. | |
| 2004/0040166 A1 | 3/2004 | Raab et al. | |
| 2004/0103547 A1 | 6/2004 | Raab et al. | |
| 2004/0111908 A1 | 6/2004 | Raab et al. | |
| 2004/0119020 A1 | 6/2004 | Bodkin | |
| 2004/0135990 A1 | 7/2004 | Ohtomo et al. | |
| 2004/0139265 A1 | 7/2004 | Hocker, III et al. | |
| 2004/0158355 A1 | 8/2004 | Holmqvist et al. | |
| 2004/0162700 A1 | 8/2004 | Rosenberg et al. | |
| 2004/0179570 A1 | 9/2004 | Vitruk et al. | |
| 2004/0221790 A1 | 11/2004 | Sinclair et al. | |
| 2004/0246462 A1 | 12/2004 | Kaneko et al. | |
| 2004/0259533 A1 | 12/2004 | Nixon et al. | |
| 2005/0016008 A1 | 1/2005 | Raab et al. | |
| 2005/0028393 A1 | 2/2005 | Raab et al. | |
| 2005/0046823 A1 | 3/2005 | Ando et al. | |
| 2005/0058332 A1 | 3/2005 | Kaufman et al. | |
| 2005/0082262 A1 | 4/2005 | Rueb et al. | |
| 2005/0085940 A1 | 4/2005 | Griggs et al. | |
| 2005/0115092 A1 | 4/2005 | Griggs et al. | |
| 2005/0111514 A1 | 5/2005 | Matsumoto et al. | |
| 2005/0141052 A1 | 6/2005 | Becker et al. | |
| 2005/0144799 A1 | 7/2005 | Raab et al. | |
| 2005/0150123 A1 | 7/2005 | Eaton | |
| 2005/0151963 A1 | 7/2005 | Pulla et al. | |
| 2005/0166413 A1 | 8/2005 | Crampton | |
| 2005/0172503 A1 | 8/2005 | Kumagai et al. | |
| 2005/0188557 A1 | 9/2005 | Raab et al. | |
| 2005/0190384 A1 | 9/2005 | Persi et al. | |
| 2005/0259271 A1 | 11/2005 | Christoph | |
| 2005/0276466 A1 | 12/2005 | Vaccaro et al. | |
| 2005/0283989 A1 | 12/2005 | Pettersson | |
| 2006/0016086 A1 | 1/2006 | Raab et al. | |
| 2006/0017720 A1 | 1/2006 | Li | |
| 2006/0026851 A1 | 2/2006 | Raab et al. | |
| 2006/0028203 A1 | 2/2006 | Kawashima et al. | |
| 2006/0053647 A1 | 3/2006 | Raab et al. | |
| 2006/0056459 A1 | 3/2006 | Stratton et al. | |
| 2006/0056559 A1 | 3/2006 | Pleasant et al. | |
| 2006/0059270 A1 | 3/2006 | Pleasant et al. | |
| 2006/0061566 A1 | 3/2006 | Verma et al. | |
| 2006/0088044 A1 | 4/2006 | Hammerl et al. | |
| 2006/0096108 A1 | 5/2006 | Raab et al. | |
| 2006/0103853 A1 | 5/2006 | Palmateer | |
| 2006/0109536 A1 | 5/2006 | Mettenleiter et al. | |
| 2006/0123649 A1 | 6/2006 | Muller | |
| 2006/0129349 A1 | 6/2006 | Raab et al. | |
| 2006/0132803 A1 | 6/2006 | Clair et al. | |
| 2006/0145703 A1 | 7/2006 | Steinbichler et al. | |
| 2006/0169050 A1 | 8/2006 | Kobayashi et al. | |
| 2006/0169608 A1 | 8/2006 | Carnevali et al. | |
| 2006/0170870 A1 | 8/2006 | Kaufman et al. | |
| 2006/0186301 A1 | 8/2006 | Dozier et al. | |
| 2006/0193521 A1 | 8/2006 | England, III et al. | |
| 2006/0241791 A1 | 10/2006 | Pokorny et al. | |
| 2006/0245717 A1 | 11/2006 | Ossig et al. | |
| 2006/0282574 A1 | 12/2006 | Zotov et al. | |
| 2006/0287769 A1 | 12/2006 | Yanagita et al. | |
| 2006/0291970 A1 | 12/2006 | Granger | |

(56) References Cited

U.S. PATENT DOCUMENTS

| | | |
|---|---|---|
| 2007/0019212 A1 | 1/2007 | Gatsios et al. |
| 2007/0030841 A1 | 2/2007 | Lee et al. |
| 2007/0043526 A1 | 2/2007 | De Jonge et al. |
| 2007/0050774 A1 | 3/2007 | Eldson et al. |
| 2007/0055806 A1 | 3/2007 | Stratton et al. |
| 2007/0058154 A1 | 3/2007 | Reichert et al. |
| 2007/0058162 A1 | 3/2007 | Granger |
| 2007/0064976 A1 | 3/2007 | England, III |
| 2007/0097382 A1 | 5/2007 | Granger |
| 2007/0100498 A1 | 5/2007 | Matsumoto et al. |
| 2007/0105238 A1 | 5/2007 | Mandl et al. |
| 2007/0118269 A1 | 5/2007 | Gibson et al. |
| 2007/0122250 A1 | 5/2007 | Mullner |
| 2007/0142970 A1 | 6/2007 | Burbank et al. |
| 2007/0147265 A1 | 6/2007 | Eidson et al. |
| 2007/0147435 A1 | 6/2007 | Hamilton et al. |
| 2007/0147562 A1 | 6/2007 | Eidson |
| 2007/0150111 A1 | 6/2007 | Wu et al. |
| 2007/0151390 A1 | 7/2007 | Blumenkranz et al. |
| 2007/0153297 A1 | 7/2007 | Lau |
| 2007/0163134 A1 | 7/2007 | Eaton |
| 2007/0163136 A1 | 7/2007 | Eaton et al. |
| 2007/0171394 A1 | 7/2007 | Steiner et al. |
| 2007/0176648 A1 | 8/2007 | Baer |
| 2007/0177016 A1 | 8/2007 | Wu |
| 2007/0181685 A1 | 8/2007 | Zhu et al. |
| 2007/0183459 A1 | 8/2007 | Eidson |
| 2007/0185682 A1 | 8/2007 | Eidson |
| 2007/0217169 A1 | 9/2007 | Yeap et al. |
| 2007/0217170 A1 | 9/2007 | Yeap et al. |
| 2007/0221522 A1 | 9/2007 | Yamada et al. |
| 2007/0223477 A1 | 9/2007 | Eidson |
| 2007/0229929 A1 | 10/2007 | Soreide et al. |
| 2007/0243458 A1* | 10/2007 | Roehm .............. B25F 5/02 429/96 |
| 2007/0247615 A1 | 10/2007 | Bridges et al. |
| 2007/0248122 A1 | 10/2007 | Hamilton |
| 2007/0256311 A1 | 11/2007 | Ferrari |
| 2007/0257660 A1 | 11/2007 | Pleasant et al. |
| 2007/0258378 A1 | 11/2007 | Hamilton |
| 2007/0294045 A1 | 12/2007 | Atwell et al. |
| 2008/0032190 A1* | 2/2008 | Furuta .............. B25F 5/02 429/163 |
| 2008/0046221 A1 | 2/2008 | Stathis |
| 2008/0052808 A1 | 3/2008 | Leick et al. |
| 2008/0052936 A1 | 3/2008 | Briggs et al. |
| 2008/0066583 A1 | 3/2008 | Lott et al. |
| 2008/0068103 A1 | 3/2008 | Cutler |
| 2008/0075326 A1 | 3/2008 | Otani et al. |
| 2008/0080562 A1 | 4/2008 | Burch et al. |
| 2008/0096108 A1 | 4/2008 | Sumiyama et al. |
| 2008/0098272 A1 | 4/2008 | Fairbanks et al. |
| 2008/0148585 A1 | 6/2008 | Raab et al. |
| 2008/0154538 A1 | 6/2008 | Stathis |
| 2008/0183065 A1 | 7/2008 | Goldbach |
| 2008/0196260 A1 | 8/2008 | Pettersson |
| 2008/0204699 A1 | 8/2008 | Benz et al. |
| 2008/0211327 A1* | 9/2008 | Schlegel .............. B25F 5/02 310/50 |
| 2008/0216552 A1 | 9/2008 | Ibach et al. |
| 2008/0228331 A1 | 9/2008 | McNerney et al. |
| 2008/0232269 A1 | 9/2008 | Tatman et al. |
| 2008/0235969 A1 | 10/2008 | Jordil et al. |
| 2008/0235970 A1 | 10/2008 | Crampton |
| 2008/0240321 A1 | 10/2008 | Narus et al. |
| 2008/0245452 A1 | 10/2008 | Law et al. |
| 2008/0246943 A1 | 10/2008 | Kaufman et al. |
| 2008/0252671 A1 | 10/2008 | Cannell et al. |
| 2008/0256814 A1 | 10/2008 | Pettersson |
| 2008/0257023 A1 | 10/2008 | Jordil et al. |
| 2008/0263411 A1 | 10/2008 | Baney et al. |
| 2008/0271332 A1 | 11/2008 | Jordil et al. |
| 2008/0273758 A1 | 11/2008 | Fuchs et al. |
| 2008/0282564 A1 | 11/2008 | Pettersson |
| 2008/0179206 A1 | 12/2008 | Feinstein et al. |
| 2008/0295349 A1 | 12/2008 | Uhl et al. |
| 2008/0298254 A1 | 12/2008 | Eidson |
| 2008/0302200 A1 | 12/2008 | Tobey |
| 2008/0309460 A1 | 12/2008 | Jefferson et al. |
| 2008/0309546 A1 | 12/2008 | Wakayama et al. |
| 2009/0000136 A1 | 1/2009 | Crampton |
| 2009/0010740 A1 | 1/2009 | Ferrari et al. |
| 2009/0016475 A1 | 1/2009 | Rischar et al. |
| 2009/0021351 A1 | 1/2009 | Beniyama et al. |
| 2009/0031575 A1 | 2/2009 | Tomelleri |
| 2009/0046140 A1 | 2/2009 | Lashmet et al. |
| 2009/0046752 A1 | 2/2009 | Bueche et al. |
| 2009/0046895 A1 | 2/2009 | Pettersson et al. |
| 2009/0049704 A1 | 2/2009 | Styles et al. |
| 2009/0051938 A1 | 2/2009 | Miousset et al. |
| 2009/0083985 A1 | 4/2009 | Ferrari |
| 2009/0089004 A1 | 4/2009 | Vook et al. |
| 2009/0089078 A1 | 4/2009 | Bursey |
| 2009/0089233 A1 | 4/2009 | Gach et al. |
| 2009/0089623 A1 | 4/2009 | Neering et al. |
| 2009/0095047 A1 | 4/2009 | Patel et al. |
| 2009/0100949 A1 | 4/2009 | Shirai et al. |
| 2009/0109797 A1 | 4/2009 | Eidson |
| 2009/0113183 A1 | 4/2009 | Barford et al. |
| 2009/0113229 A1 | 4/2009 | Cataldo et al. |
| 2009/0122805 A1 | 5/2009 | Epps et al. |
| 2009/0125196 A1 | 5/2009 | Velazquez et al. |
| 2009/0133276 A1 | 5/2009 | Bailey et al. |
| 2009/0133494 A1 | 5/2009 | Van Dam et al. |
| 2009/0157419 A1 | 6/2009 | Bursey |
| 2009/0161091 A1 | 6/2009 | Yamamoto |
| 2009/0165317 A1 | 7/2009 | Little |
| 2009/0177435 A1 | 7/2009 | Heininen |
| 2009/0177438 A1 | 7/2009 | Raab |
| 2009/0187373 A1 | 7/2009 | Atwell |
| 2009/0241360 A1 | 10/2009 | Tait et al. |
| 2009/0249634 A1 | 10/2009 | Pettersson |
| 2009/0265946 A1 | 10/2009 | Jordil et al. |
| 2009/0299689 A1 | 12/2009 | Stubben et al. |
| 2009/0323742 A1 | 12/2009 | Kumano |
| 2010/0030421 A1 | 2/2010 | Yoshimura et al. |
| 2010/0040742 A1 | 2/2010 | Dijkhuis et al. |
| 2010/0049891 A1 | 2/2010 | Hartwich et al. |
| 2010/0057392 A1 | 3/2010 | York |
| 2010/0078866 A1 | 4/2010 | Pettersson |
| 2010/0095542 A1 | 4/2010 | Ferrari |
| 2010/0122920 A1 | 5/2010 | Butter et al. |
| 2010/0123892 A1 | 5/2010 | Miller et al. |
| 2010/0134596 A1 | 6/2010 | Becker |
| 2010/0135534 A1 | 6/2010 | Weston et al. |
| 2010/0195086 A1 | 8/2010 | Ossig et al. |
| 2010/0208062 A1 | 8/2010 | Pettersson |
| 2010/0245851 A1 | 9/2010 | Teodorescu |
| 2010/0277747 A1 | 11/2010 | Rueb et al. |
| 2010/0281705 A1 | 11/2010 | Verdi et al. |
| 2010/0286941 A1 | 11/2010 | Merlot |
| 2010/0312524 A1 | 12/2010 | Siercks et al. |
| 2010/0318319 A1 | 12/2010 | Maierhofer |
| 2010/0325907 A1 | 12/2010 | Tait |
| 2011/0007305 A1 | 1/2011 | Bridges et al. |
| 2011/0007326 A1 | 1/2011 | Daxauer et al. |
| 2011/0013199 A1 | 1/2011 | Siercks et al. |
| 2011/0019155 A1 | 1/2011 | Daniel et al. |
| 2011/0023578 A1 | 2/2011 | Grasser |
| 2011/0043515 A1 | 2/2011 | Stathis |
| 2011/0066781 A1 | 3/2011 | Debelak et al. |
| 2011/0094908 A1 | 4/2011 | Trieu et al. |
| 2011/0107611 A1 | 5/2011 | Desforges et al. |
| 2011/0107612 A1 | 5/2011 | Ferrari et al. |
| 2011/0111849 A1 | 5/2011 | Sprague et al. |
| 2011/0112786 A1 | 5/2011 | Desforges et al. |
| 2011/0119025 A1 | 5/2011 | Fetter et al. |
| 2011/0123097 A1 | 5/2011 | Van Coppenolle et al. |
| 2011/0164114 A1 | 7/2011 | Kobayashi et al. |
| 2011/0166824 A1 | 7/2011 | Haisty et al. |
| 2011/0169924 A1 | 7/2011 | Haisty et al. |
| 2011/0173827 A1 | 7/2011 | Bailey et al. |
| 2011/0173828 A1 | 7/2011 | York |
| 2011/0178755 A1 | 7/2011 | York |

(56) References Cited

U.S. PATENT DOCUMENTS

| | | | |
|---|---|---|---|
| 2011/0178765 A1 | 7/2011 | Atwell et al. | |
| 2011/0192043 A1 | 8/2011 | Ferrari et al. | |
| 2011/0282622 A1 | 11/2011 | Canter et al. | |
| 2011/0288684 A1 | 11/2011 | Farlow et al. | |
| 2011/0308831 A1* | 12/2011 | Martinsson | B25F 5/02 173/217 |
| 2012/0044476 A1 | 2/2012 | Earhart et al. | |
| 2012/0046820 A1 | 2/2012 | Allard et al. | |
| 2012/0069325 A1 | 3/2012 | Schumann et al. | |
| 2012/0069352 A1 | 3/2012 | Ossig et al. | |
| 2012/0133953 A1 | 5/2012 | Ossig et al. | |
| 2012/0154786 A1 | 6/2012 | Gosch et al. | |
| 2012/0155744 A1 | 6/2012 | Kennedy et al. | |
| 2012/0181194 A1 | 7/2012 | McEwan et al. | |
| 2012/0197439 A1 | 8/2012 | Wang et al. | |
| 2012/0210678 A1 | 8/2012 | Alcouloumre et al. | |
| 2012/0229788 A1 | 9/2012 | Schumann et al. | |
| 2012/0260512 A1 | 10/2012 | Kretschmer et al. | |
| 2012/0262700 A1 | 10/2012 | Schumann et al. | |
| 2012/0287265 A1 | 11/2012 | Schumann et al. | |
| 2013/0025143 A1 | 1/2013 | Bailey et al. | |
| 2013/0062243 A1 | 3/2013 | Chang et al. | |
| 2013/0094024 A1 | 4/2013 | Ruhland et al. | |
| 2013/0125408 A1 | 5/2013 | Atwell et al. | |
| 2013/0222816 A1 | 8/2013 | Briggs et al. | |
| 2014/0063489 A1 | 3/2014 | Steffey et al. | |
| 2014/0160348 A1 | 6/2014 | Wang et al. | |
| 2014/0226190 A1 | 8/2014 | Bridges et al. | |
| 2014/0362424 A1 | 12/2014 | Bridges et al. | |
| 2015/0109419 A1 | 4/2015 | Vollrath et al. | |
| 2015/0241204 A1 | 8/2015 | Steffey et al. | |
| 2015/0378023 A1 | 12/2015 | Royo Royo et al. | |
| 2016/0033643 A1 | 2/2016 | Zweigle et al. | |
| 2017/0117519 A1* | 4/2017 | Schoenherr | H01M 2/1072 |
| 2017/0162839 A1* | 6/2017 | Botadra | H01M 2/105 |

FOREIGN PATENT DOCUMENTS

| | | |
|---|---|---|
| AU | 2005200937 A1 | 9/2006 |
| CN | 2236119 Y | 9/1996 |
| CN | 1133969 A | 10/1996 |
| CN | 1307241 A | 8/2001 |
| CN | 2508896 Y | 9/2002 |
| CN | 2665668 Y | 12/2004 |
| CN | 1630804 A | 6/2005 |
| CN | 1630805 A | 6/2005 |
| CN | 1688867 A | 10/2005 |
| CN | 1735789 | 2/2006 |
| CN | 1812868 A | 8/2006 |
| CN | 1818537 A | 8/2006 |
| CN | 1838102 A | 9/2006 |
| CN | 1839293 A | 9/2006 |
| CN | 1853084 A | 10/2006 |
| CN | 1926400 A | 3/2007 |
| CN | 101024286 A | 8/2007 |
| CN | 101156043 A | 4/2008 |
| CN | 101163939 A | 4/2008 |
| CN | 101371099 A | 2/2009 |
| CN | 101416024 A | 4/2009 |
| CN | 101484828 A | 7/2009 |
| CN | 201266071 Y | 7/2009 |
| CN | 101506684 A | 8/2009 |
| CN | 101511529 A | 8/2009 |
| DE | 2216765 A1 | 4/1972 |
| DE | 2950138 A1 | 6/1981 |
| DE | 3227980 A1 | 5/1983 |
| DE | 3245060 A1 | 7/1983 |
| DE | 3340317 A1 | 8/1984 |
| DE | 4027990 C1 | 2/1992 |
| DE | 4222642 A1 | 1/1994 |
| DE | 4340756 A1 | 6/1994 |
| DE | 4303804 A1 | 8/1994 |
| DE | 4445464 A1 | 7/1995 |
| DE | 4410775 A1 | 10/1995 |
| DE | 4412044 A1 | 10/1995 |
| DE | 29622033 | 2/1997 |
| DE | 19543763 A1 | 5/1997 |
| DE | 19601875 A1 | 7/1997 |
| DE | 19607345 A1 | 8/1997 |
| DE | 19720049 A1 | 11/1998 |
| DE | 19811550 A1 | 9/1999 |
| DE | 19820307 A1 | 11/1999 |
| DE | 19850118 A1 | 5/2000 |
| DE | 19928958 A1 | 11/2000 |
| DE | 10114126 A1 | 10/2001 |
| DE | 10026357 A1 | 1/2002 |
| DE | 20208077 U1 | 5/2002 |
| DE | 10137241 A1 | 9/2002 |
| DE | 10149750 A1 | 9/2002 |
| DE | 10155488 A1 | 5/2003 |
| DE | 10219054 A1 | 11/2003 |
| DE | 10232028 A1 | 2/2004 |
| DE | 10336458 A1 | 2/2004 |
| DE | 10244643 A1 | 4/2004 |
| DE | 20320216 U1 | 4/2004 |
| DE | 10304188 A1 | 8/2004 |
| DE | 10313223 A1 | 10/2004 |
| DE | 10326848 A1 | 1/2005 |
| DE | 202005000983 U1 | 3/2005 |
| DE | 10361870 A1 | 7/2005 |
| DE | 102004015668 B3 | 9/2005 |
| DE | 102004015111 A1 | 10/2005 |
| DE | 102004028090 A1 | 12/2005 |
| DE | 102004043828 A1 | 3/2006 |
| DE | 202006005643 U1 | 8/2006 |
| DE | 102004010083 B4 | 11/2006 |
| DE | 102005043931 A1 | 3/2007 |
| DE | 102005056265 A1 | 5/2007 |
| DE | 102006053611 A1 | 5/2007 |
| DE | 102005060967 A1 | 6/2007 |
| DE | 102006023902 A1 | 11/2007 |
| DE | 102006024534 A1 | 11/2007 |
| DE | 102006035292 A1 | 1/2008 |
| DE | 202006020299 U1 | 5/2008 |
| DE | 102007037162 A1 | 2/2009 |
| DE | 102008014274 A1 | 8/2009 |
| DE | 102008039838 A1 | 3/2010 |
| DE | 102005036929 B4 | 6/2010 |
| DE | 102008062763 B3 | 7/2010 |
| DE | 102009001894 A1 | 9/2010 |
| DE | 102009035336 B3 | 11/2010 |
| DE | 102009055988 B3 | 3/2011 |
| DE | 202010005042 U1 | 8/2011 |
| DE | 102010032723 B3 | 11/2011 |
| DE | 102010032726 B3 | 11/2011 |
| DE | 102010033561 B3 | 12/2011 |
| DE | 102010032725 A1 | 1/2012 |
| DE | 202011051975 U1 | 2/2013 |
| DE | 102012107544 B3 | 5/2013 |
| DE | 102012109481 A1 | 4/2014 |
| DE | 102012112322 A1 | 6/2014 |
| EP | 0546784 A2 | 6/1993 |
| EP | 0667549 A2 | 8/1995 |
| EP | 0727642 A1 | 8/1996 |
| EP | 0730210 A1 | 9/1996 |
| EP | 0614517 A1 | 3/1997 |
| EP | 0838696 A1 | 4/1998 |
| EP | 0905803 A1 | 3/1999 |
| EP | 0949524 A1 | 10/1999 |
| EP | 1160539 A1 | 12/2001 |
| EP | 1189124 A1 | 3/2002 |
| EP | 0767357 B1 | 5/2002 |
| EP | 1310764 A2 | 5/2003 |
| EP | 1342989 A2 | 9/2003 |
| EP | 1347267 A1 | 9/2003 |
| EP | 1361414 A1 | 11/2003 |
| EP | 1452279 A1 | 9/2004 |
| EP | 1468791 A1 | 10/2004 |
| EP | 1056987 B1 | 4/2005 |
| EP | 1528410 A1 | 5/2005 |
| EP | 1669713 A1 | 6/2006 |
| EP | 1734425 | 12/2006 |
| EP | 1429109 B1 | 4/2007 |

(56) References Cited

FOREIGN PATENT DOCUMENTS

| | | |
|---|---|---|
| EP | 1764579 | 12/2007 |
| EP | 1764579 B1 | 12/2007 |
| EP | 1878543 A2 | 1/2008 |
| EP | 1882895 A1 | 1/2008 |
| EP | 1967930 A2 | 9/2008 |
| EP | 2003419 A1 | 12/2008 |
| EP | 2005112 B1 | 12/2008 |
| EP | 2023077 A1 | 2/2009 |
| EP | 2042905 A1 | 4/2009 |
| EP | 2060530 A1 | 5/2009 |
| EP | 2068067 A1 | 6/2009 |
| EP | 2068114 | 6/2009 |
| EP | 2108917 A1 | 10/2009 |
| EP | 2177868 A2 | 4/2010 |
| EP | 2259013 A1 | 12/2010 |
| EP | 2400261 A1 | 12/2011 |
| EP | 2428764 | 3/2012 |
| EP | 2693300 A2 | 2/2014 |
| EP | 2728306 A1 | 5/2014 |
| FR | 2603228 A1 | 3/1988 |
| FR | 2935043 A1 | 2/2010 |
| GB | 894320 | 4/1962 |
| GB | 1112941 | 5/1968 |
| GB | 2222695 A | 3/1990 |
| GB | 2255648 A | 11/1992 |
| GB | 2336493 A | 10/1999 |
| GB | 2341203 A | 3/2000 |
| GB | 2388661 A | 11/2003 |
| GB | 2420241 A | 5/2006 |
| GB | 2447258 A | 9/2008 |
| GB | 2452033 A | 2/2009 |
| GB | 2452033 A | 2/2009 |
| JP | 5581525 | 6/1955 |
| JP | 575584 A | 1/1982 |
| JP | 58171291 A | 1/1983 |
| JP | 5827264 | 2/1983 |
| JP | S58171291 A | 10/1983 |
| JP | 59133890 A | 8/1984 |
| JP | 61062885 A | 3/1986 |
| JP | S61157095 A | 7/1986 |
| JP | 63135814 A | 6/1988 |
| JP | 0357911 A | 3/1991 |
| JP | 04115108 A | 4/1992 |
| JP | 04225188 A1 | 8/1992 |
| JP | 04267214 A | 9/1992 |
| JP | 0572477 A | 3/1993 |
| JP | 06313710 A | 11/1994 |
| JP | 1994313710 A | 11/1994 |
| JP | 06331733 | 12/1994 |
| JP | 06341838 | 12/1994 |
| JP | 074950 A | 1/1995 |
| JP | 07128051 A | 5/1995 |
| JP | 7210586 A | 8/1995 |
| JP | 07229963 A | 8/1995 |
| JP | 0815413 A | 1/1996 |
| JP | 0821714 A | 1/1996 |
| JP | 08129145 A | 5/1996 |
| JP | H08136849 A | 5/1996 |
| JP | H08145678 A | 6/1996 |
| JP | 08262140 A | 10/1996 |
| JP | 0921868 A | 1/1997 |
| JP | H1054111 A | 2/1998 |
| JP | 10213661 A | 8/1998 |
| JP | 1123993 A | 1/1999 |
| JP | 2001056275 A | 8/1999 |
| JP | 2000121724 A | 4/2000 |
| JP | 2000249546 A | 9/2000 |
| JP | 2000339468 A | 12/2000 |
| JP | 2001013001 A | 1/2001 |
| JP | 2001021303 A | 1/2001 |
| JP | 2001066211 A | 3/2001 |
| JP | 2001337278 A | 12/2001 |
| JP | 2003050128 A | 2/2003 |
| JP | 2003156330 A | 5/2003 |
| JP | 2003156562 A | 5/2003 |
| JP | 2003194526 A | 7/2003 |
| JP | 2003202215 A | 7/2003 |
| JP | 2003216255 A | 7/2003 |
| JP | 2003308205 A | 10/2003 |
| JP | 2004093504 A | 3/2004 |
| JP | 2004109106 A | 4/2004 |
| JP | 2004245832 A | 9/2004 |
| JP | 2004257927 A | 9/2004 |
| JP | 2004333398 A | 11/2004 |
| JP | 2004348575 A | 12/2004 |
| JP | 2005030937 A | 2/2005 |
| JP | 2005055226 A | 3/2005 |
| JP | 2005069700 A | 3/2005 |
| JP | 2005174887 A | 6/2005 |
| JP | 2005517908 A1 | 6/2005 |
| JP | 2005215917 A | 8/2005 |
| JP | 2005221336 A | 8/2005 |
| JP | 2005257510 A | 9/2005 |
| JP | 2006038683 A | 2/2006 |
| JP | 2006102176 A | 4/2006 |
| JP | 2006203404 A | 8/2006 |
| JP | 2006226948 A | 8/2006 |
| JP | 2006241833 A | 9/2006 |
| JP | 2006266821 A | 10/2006 |
| JP | 2006301991 A | 11/2006 |
| JP | 2007178943 A | 7/2007 |
| JP | 2008076303 A | 4/2008 |
| JP | 2008082707 A | 4/2008 |
| JP | 2008096123 A | 4/2008 |
| JP | 2008107286 A | 5/2008 |
| JP | 2008304220 A | 12/2008 |
| JP | 2009063339 A | 3/2009 |
| JP | 2009524057 | 6/2009 |
| JP | 2009531674 A | 9/2009 |
| JP | 2009229255 A | 10/2009 |
| JP | 2009541758 A | 11/2009 |
| JP | 2010169405 A | 8/2010 |
| JP | 2013516928 A | 5/2013 |
| JP | 2013517508 A | 5/2013 |
| JP | 2013117417 A | 6/2013 |
| JP | 2013543970 A | 12/2013 |
| WO | 8801924 A1 | 3/1988 |
| WO | 8905512 A1 | 6/1989 |
| WO | 9208568 A1 | 5/1992 |
| WO | 9711399 | 3/1997 |
| WO | 9808050 A1 | 2/1998 |
| WO | 0014474 | 3/2000 |
| WO | 0020880 A2 | 4/2000 |
| WO | 0026612 A1 | 5/2000 |
| WO | 0033149 A1 | 6/2000 |
| WO | 0034733 A1 | 6/2000 |
| WO | 0063645 A1 | 10/2000 |
| WO | 0063681 A2 | 10/2000 |
| WO | 0177613 A1 | 10/2001 |
| WO | 02084327 A2 | 10/2002 |
| WO | 02088855 A1 | 11/2002 |
| WO | 02101323 A2 | 12/2002 |
| WO | 2004096502 A1 | 11/2004 |
| WO | 2005008271 A2 | 1/2005 |
| WO | 2005059473 A2 | 6/2005 |
| WO | 2005072917 A1 | 8/2005 |
| WO | 2005075875 | 8/2005 |
| WO | 2005100908 A1 | 10/2005 |
| WO | 2005103863 | 11/2005 |
| WO | 2006000552 A1 | 1/2006 |
| WO | 2006014445 A1 | 2/2006 |
| WO | 2006051264 A1 | 5/2006 |
| WO | 2006053837 A1 | 5/2006 |
| WO | 2007002319 A1 | 1/2007 |
| WO | 200712198 A1 | 2/2007 |
| WO | 2007028941 | 3/2007 |
| WO | 2007051972 A1 | 5/2007 |
| WO | 2007087198 A1 | 8/2007 |
| WO | 2007118478 A1 | 10/2007 |
| WO | 2007125081 A1 | 11/2007 |
| WO | 2007144906 A1 | 12/2007 |
| WO | 2008019856 A1 | 2/2008 |
| WO | 2008027588 A2 | 3/2008 |
| WO | 2008047171 A1 | 4/2008 |

(56) References Cited

FOREIGN PATENT DOCUMENTS

| | | |
|---|---|---|
| WO | 2008048424 A2 | 4/2008 |
| WO | 2008052348 A1 | 5/2008 |
| WO | 2008064276 A3 | 5/2008 |
| WO | 2008066896 | 6/2008 |
| WO | 2008068791 A1 | 6/2008 |
| WO | 2008075170 A1 | 6/2008 |
| WO | 2008121073 A1 | 10/2008 |
| WO | 2008157061 A1 | 12/2008 |
| WO | 2009001165 A1 | 12/2008 |
| WO | 2009003225 A1 | 1/2009 |
| WO | 2009016185 A1 | 2/2009 |
| WO | 2009053085 A1 | 4/2009 |
| WO | 2009083452 A1 | 7/2009 |
| WO | 2009095384 A2 | 8/2009 |
| WO | 2009123278 A1 | 10/2009 |
| WO | 2009127526 A1 | 10/2009 |
| WO | 2009130169 A1 | 10/2009 |
| WO | 2009149740 A1 | 12/2009 |
| WO | 2010015086 A1 | 2/2010 |
| WO | 2010040742 A1 | 4/2010 |
| WO | 2010092131 A1 | 8/2010 |
| WO | 2010108089 A2 | 9/2010 |
| WO | 2010108644 A1 | 9/2010 |
| WO | 2010148525 A1 | 12/2010 |
| WO | 2011000435 A1 | 1/2011 |
| WO | 2011000955 A1 | 1/2011 |
| WO | 2011021103 A1 | 2/2011 |
| WO | 2011029140 A1 | 3/2011 |
| WO | 2011057130 A2 | 5/2011 |
| WO | 2011060899 A1 | 5/2011 |
| WO | 2011002908 A1 | 6/2011 |
| WO | 2011090829 A2 | 7/2011 |
| WO | 2011090895 A1 | 7/2011 |
| WO | 2012037157 A2 | 3/2012 |
| WO | 2012038142 A1 | 3/2012 |
| WO | 2012038446 A1 | 3/2012 |
| WO | 2012061122 A1 | 5/2012 |
| WO | 2012013525 A2 | 8/2012 |
| WO | 2012103525 A2 | 8/2012 |
| WO | 2012112683 A2 | 8/2012 |
| WO | 2012125671 A1 | 9/2012 |
| WO | 2012168322 A2 | 12/2012 |
| WO | 2013112455 A1 | 8/2013 |
| WO | 2013184340 A1 | 12/2013 |
| WO | 2013186160 A1 | 12/2013 |
| WO | 2013188026 A1 | 12/2013 |
| WO | 2013190031 A1 | 12/2013 |
| WO | 2014128498 A2 | 8/2014 |
| WO | 2014159799 A1 | 10/2014 |

OTHER PUBLICATIONS

Horn, B.K.P., "Closed-Form Solution of Absolute Orientation Using Unit Quaternions" J. Opt. Soc. Am. A., vol. 4., No. 4, Apr. 1987, pp. 629-642, ISSN 0740-3232.

German Office Action for Application No. 10 2015 122 844.0 dated Aug. 22, 2016; 6 pages.

"Scanner Basis Configuration for Riegl VQ-250", Riegl Company Webpage, Feb. 16, 2011 (Feb. 16, 2011) [retrieved on Apr. 19, 2013 (Apr. 19, 2013)]. Retrieved from the internet; 3 pages.

14th International Forensic Science Symposium, Interpol—Lyon, France, Oct. 19-22, 2004, Review Papers, Edited by Dr. Niamh Nic Daeid, Forensic Science Unit, Univeristy of Strathclyde, Glasgow, UK; 585 pages.

A. Hart; "Kinematic Coupling Interchangeability" Precision Engineering; vol. 28, No. 1; Jan. 1, 2004 (Jan. 1, 2004) pp. 1-15.

ABB Flexible Automation AB: "Product Manual IRB 6400R M99, On-line Manual"; Sep. 13, 2006; XP00002657684; Retrieved from the Internet: URL: http://pergatory.mit.edu/kinematiccouplings/case_studies/ABB_Robotics/general/6400R%20Product%20Manual.pdf (re.

Akca, Devrim, Full Automatic Registration of Laser Scanner Point Clouds, Optical 3D Measurement Techniques, vol. VI, 2003, XP002590305, ETH, Swiss Federal Institute of Technology, Zurich, Institute of Geodesy and Photogrammetry, DOI:10.3929/ethz-a-004656.

Anonymous : So wird's gemacht: Mit T-DSL und Windows XP Home Edition gemeinsam ins Internet (Teil 3) Internet Citation, Jul. 2003 (Jul. 2003), XP002364586, Retrieved from Internet: URL:http://support.microsfot.com/kb/814538/DE/ [retrieved on Jan. 26, 2006].

Bornaz, L., et al., "Multiple Scan Registration in Lidar Close-Range Applications," The International Archives of the Photogrammetry, Remote Sensing and Spatial Information Sciences, vol. XXXIV, Part 5/W12, Jul. 2003 (Jul. 2003), pp. 72-77, XP002590306.

Bouvet, D., et al., "Precise 3-D Localization by Automatic Laser Theodolite and Odometer for Civil-Engineering Machines", Proceedings of the 2001 IEEE International Conference on Robotics and Automation. ICRA 2001. Seoul, Korea, May 21-26, 2001; IEEE, US.

Brenneke et al: "Using 3D laser range data for slam in outsoor enviomments." Proceedings of the 2003 IEEE/RSJ International Conference on Intelligent Robots and Systems. Las Vegas, NV Oct. 27-31, 2003; IEEE US, vol. 1, Oct. 27, 2003, pp. 188-193.

Cho, et al., Implementation of a Precision Time Protocol over Low Rate Wireless Personal Area Networks, IEEE, 2008. 8 pages.

Cho, Yong K., et al. "Light-weight 3D ladar system for construction robotic operations" 26th International Symposium on Automation and Robotics in Construction (ISARC 2009), 2009, XP55068755, Retrieved from Internet: URL:http://www.iaarc.org/publications/fulltext/Light-weight_3D_ladar_system_for_construction_robotic_operations.pdf [retrieved on Jun. 28, 2013].

Cooklev, et al., An Implementation of IEEE 1588 Over IEEE 802.11b for Syncrhonization of Wireless Local Area Network Nodes, IEEE Transactions on Instrumentation and Measurement, vol. 56, No. 5, Oct. 2007, 8 pages.

Creaform Metrology Solutions, "Handy Scan 3D—The Truly Portable Metrology-Grade 3D Scanners" brochure, 2014; 7 pages.

Creaform, "Creaform Releases Completely Re-Engineered Handyscan 3D Portable Scanners", May 5, 2014, 1 page.

Decision Revoking the European Patent (Art. 101(3)(b) EPC) dated Aug. 14, 2013, filed in Opposition re Application No. 07 785 873.6/Patent No. 2 062 069, Proprietor: Faro Technologies, Inc., filed by Leica Geosystem AG on Feb. 5, 2013, 12 pages.

Dylan, Craig R., High Precision Makes the Massive Bay Bridge Project Work. Suspended in MidAir—Cover Story—Point of Beginning, Jan. 1, 2010, [online] http://www.pobonline.com/Articles/Cover_Story/BNP_GUID_9-5-2006_A_10000000000 . . . [Retreived Feb. 25, 2010].

Electro-Optical Information Systems, "The Handy Handheld Digitizer" [online], [retrieved on Nov. 29, 2011], http://vidibotics.com/htm/handy.htm, 2 pages.

Elstrom, M.D., et al., Stereo-Based Registration of LADAR and Color Imagery, Intelligent Robots and Computer Vision XVII: Algorithms, Techniques, and Active Vision, Boston, MA, USA, vol. 3522, Nov. 2, 1998 (Nov. 2, 1998), Nov. 3, 1998 (Nov. 3, 1998) p. 343-354.

EO Edmund Optics "Silicon Detectors" (5 pages) 2013 Edmund Optics, Inc. http://www.edmundoptics.com/electro-optics/detector-components/silicon-detectors/1305[Oct. 15, 2013 10:14:53 AM].

FARO Laser Scanner LS, Recording Reality's Digital Fingerprint, The Measure of Success, Rev. Aug. 22, 2005, 16 pages.

FARO Laser Scanner LS, Presentation Forensic Package, Policeschool of Hessen, Wiesbaden, Germany, Dec. 14, 2005; FARO Technologies, Copyright 2008, 17 pages.

FARO Product Catalog; Faro Arm; 68 pages; Faro Technologies Inc. 2009; printed Aug. 3, 2009.

Franklin, Paul F., What IEEE 1588 Means for Your Next T&M System Design, Keithley Instruments, Inc., [on-line] Oct. 19, 2010, http://www.eetimes.com/General/DisplayPrintViewContent?contentItemId=4209746, [Retreived Oct. 21, 2010], 6 pages.

Gebre, et al. "Remotely Operated and Autonomous Mapping System (ROAMS)." Technologies for Practical Robot Applications, 2009. Tepra 2009. IEEE International Conference on IEEE, Piscataway, NJ, USA. Nov. 9, 2009, pp. 173-178.

Ghost 3D Systems, Authorized MicroScribe Solutions, FAQs—MicroScribe 3D Laser, MicroScan Tools, & related info, [online],

(56) References Cited

OTHER PUBLICATIONS

[retrieved Nov. 29, 2011], http://microscribe.ghost3d.com/gt_microscan-3d_faqs.htm,. 4 pages.
Godin, G., et al., A Method for the Registration of Attributed Range Images, Copyright 2001, [Retrieved on Jan. 18, 2010 at 03:29 from IEEE Xplore]. p. 178-186.
GoMeasure3D—Your source for all things measurement, Baces 3D 100 Series Portable CMM from GoMeasure3D, [online], [retrieved Nov. 29, 2011], http://www.gomeasure3d.com/baces100.html, 3 pages.
Haag, et al., "Technical Overview and Application of 3D Laser Scanning for Shooting Reconstruction and Crime Scene Investigations", Presented at the American Academy of Forensic Sciences Scientific Meeting, Washington, D.C., Feb. 21, 2008; 71 pages.
Harrison A. et al., "High Quality 3D Laser Ranging Under General Vehicle Motion", 2008 IEEE International Conference on Robotics and Automation, May 19-23, 2008, pp. 7-12, XP031340123.
Hart, A., "Kinematic Coupling Interchangeability", Precision Engineering, vol. 28, No. 1, Jan. 1, 2004, pp. 1-15, XP55005507, ISSN: 0141-6359, DOI: 10.1016/S0141-6359(03)00071-0.
Howard, et al., "Virtual Environments for Scene of Crime Reconstruction and Analysis", Advanced Interfaces Group, Department of Computer Science, University of Manchester, Manchester, UK, Feb. 28, 2000.
Huebner, S.F., "Sniper Shooting Tecnhique", "Scharfschutzen Schiebtechnik", Copyright by C.A. Civil Arms Verlag GmbH, Lichtenwald 1989, Alle Rechte vorbehalten, pp. 11-17.
HYDROpro Navigation, Hydropgraphic Survey Software, Trimble, www.trimble.com, Copyright 1997-2003.
Information on Electro-Optical Information Systems; EOIS 3D Mini-Moire C.M.M. Sensor for Non-Contact Measuring & Surface Mapping; Direct Dimensions, Jun. 1995.
Ingensand, H., Dr., "Introduction to Geodetic Metrology", "Einfuhrung in die Geodatische Messtechnik", Federal Institute of Technology Zurich, 2004, with English translation, 6 pages.
iQsun Laserscanner Brochure, 2 Pages, Apr. 2005.
It is Alive in the Lab, Autodesk University, Fun with the Immersion MicroScribe Laser Scanner, [online], [retrieved Nov. 29, 2011], http://labs.blogs.com/its_alive_in_the_lab/2007/11/fun-with-the-im.html; 3 pages.
Jaspemeite, et al., Enhancements to the Time Synchronization Standard IEEE-1588 for a System of Cascaded Bridges, IEEE, 2004.
Leica Geosystems TruStory Forensic Analysis by Albuquerque Police Department, 2006.
Leica Geosystems, FBI Crime Scene Case Study, Tony Grissim, Feb. 2006; 11 pages.
Leica Rugby 55 Designed for Interior Built for Construction Brochure, Leica Geosystems, Heerbrugg, Switzerland, www.leica-geosystems.com.
Leica TPS800 Performance Series—Equipment List, 2004, pp. 1-4.
Merriam-Webster (m-w.com), "Interface". 2012. http://www.merriam-webster.com/dictionary/interface.
Merriam-Webster (m-w.com), "Parts". 2012, pp. 1-6. http://www.merriam-webster.com/dictionary/parts.
Merriam-Webster (m-w.com), "Traverse". 2012. http://www.merriam-webster.com/dictionary/traverse.
Patrick Willoughby; "Elastically Averaged Precision Alignment"; In: "Doctoral Thesis" ; Jun. 1, 2005; Massachusetts Institute of Technology; XP55005620; Abstract 1.1 Motivation; Chapter 3, Chapter 6.
Provision of the minutes in accordance with Rule 124(4) EPC dated Aug. 14, 2013, filed in Opposition re Application No. 07 785 873.6/Patent No. 2 062 069, Proprietor: Faro Technologies, Inc., filed by Leica Geosystem AG on Feb. 5, 2013, pp. 1-10.
Romer "Romer Measuring Arms Portable CMMs for R&D and shop floor" (Mar. 2009) Hexagon Metrology (16 pages).
Spada, et al., IEEE 1588 Lowers Integration Costs in Continuous Flow Automated Production Lines, XP-002498255, ARC Insights, Insight # 2003-33MD&H, Aug. 20, 2003.
Trimble—Trimble SPS630, SPS730 and SPS930 Universal Total Stations, [on-line] http://www.trimble.com/sps630_730_930.shtml (1 of 4), [Retreived Jan. 26, 2010 8:50:29AM].
Davidson, A. et al., "MonoSLAM: Real-Time Single Camera SLAM", IEEE Transactions on Pattern Analysis and Machine Intelligence, vol. 29, No. 6, Jun. 1, 2007, pp. 1052-1067, XP011179664.
Geng, J. "Structured-Light 3D Surface Imaging: A Tutorial," Advances in Optics and Photonics 3; Mar. 31, 2011, pp. 128-160; IEEE Intelligent Transportation System Society; 2011 Optical Society of America.
Geng, J., et al., "DLP-based structured light 3D imaging technologies and applications", Emerging Digitial Micromirror Device Based Systems and Applications III, Spie, vol. 7932, No. 1, Feb. 10, 2011 (Feb. 10, 2011) 15 pgs.
Jasiobedzki, Piotr, "Laser Eye—A New 3D Sensor for Active Vision", SPIE—Sensor Fusion VI, vol. 2059, Sep. 7, 1993 (Sep. 7, 1993), pp. 316-321, XP00262856, Boston, U.S.A., Retrieved from the Internet: URL:http://scitation.aip.org/getpdf/servlet/Ge.
Kreon Laser Scanners, Getting the Best in Cutting Edge 3D Digitizing Technology, B3-D MCAD Consulting/Sales [online], [retrieved Nov. 29, 2011], http://www.b3-d.com/Kreon.html.
Langford, et al., "Practical Skills in Forensic Science", Pearson Education Limited, Essex, England, First Published 2005, Forensic Chemistry.
Laser Reverse Engineering with Microscribe, [online], [retrieved Nov. 29, 2011], http://www.youtube.com/watch?v=8VRz_2aEJ4E&feature=PlayList&p=F63ABF74F30DC81B&playnext=1&playnext_from=PL&index=1.
Lee, Min-Gu, et al., "Compact 3D lidar based on optically coupled horizontal and vertical scanning mechanism for the autonomous navigation of robots," Proceedings of SPIE, vol. 8037, May 10, 2011 (May 10, 2011), p. 80371H, XP055069052.
Leica Geosystems: "Leica Rugby 55 Designed for Interior Built for Construction", Jan. 1, 2009, XP002660558, Retrieved from the Internet: URL:http://www.leica-geosystems.com/downloads123/zz/lasers/Rugby%2055/brochures/Leica_Rugby_55_brochure_en.pdf [re.
Mahdy, Yousef B., et al; "Projector Calibration Using Passive Stereo and Triangulation"; International Journal of Future Computer and Communication; vol. 2; No. 5; 385-390; Oct. 2013; 6 pgs.
May, S. et al, "Robust 3D-Mapping with Time-of-Flight Cameras", Intelligent Robots and Systems, IROS 2009, IEEE/RSJ International Conference on Oct. 10, 2009, pp. 1673-1678, XP031581042.
MicroScan 3D User Guide, RSI GmbH, 3D Systems & Software, Oberursel, Germany, email: info@rsi-gmbh.de, Copyright RSI Roland Seifert Imaging GmbH 2008.
Moog Components Group "Technical Brief; Fiber Optic Rotary Joints" Document No. 303 (6 pages) Mar. 2008; MOOG, Inc. 2008 Canada; Focal Technologies.
MOOG Components Group; "Fiber Optic Rotary Joints; Product Guide" (4 pages) Dec. 2010; MOOG, Inc. 2010.
Ohno, K. et al., "Real-Time Robot Trajectory Estimation and 3D Map Construction Using 3D Camera", Intelligent Robots and Systems, 2006 IEEE/RSJ International Conference on Oct. 1, 2006, pp. 5279-5285, XP031006974.
P Ben-Tzvi, et al "Extraction of 3D Images Using Pitch-Actuated 2D Laser Range Finder for Robotic Vision" (6 pages) BNSDOCID <XP 31840390A_1_>, Oct. 15, 2010.
Romer Romer Absolute Arm Product Brochure: (2010); Hexagon Metrology; www.hexagonmetrology.com; Hexagon AB, 2010.
RW Boyd "Radiometry and the Detection of Otpical Radiation" (pp. 20-23) 1983 Jon wiley & Sons, Inc.
Sauter, et al., Towards New Hybrid Networks for Industrial Automation, IEEE, 2009.
Se, et al., "Instant Scene Modeler for Crime Scene Reconstruction", MDA, Space Missions, Ontario, Canada, Copyright 2005, IEEE; 8 pages.
Surmann, H. et al., "An Autonomous Mobile Robot with a 3D Laser Range Finder for 3D Exploration and Digitalization of Indoor Environments", Robotics and Autonomous Systems, Elsevier Science Publishers, vol. 45, No. 3-4, Dec. 31, 2003, pp. 181-198.
The Scene, Journal of the Association for Crime Scene Reconstruction, Apr.-Jun. 2006, vol. 12, Issue 2; 31 pages.

(56) References Cited

OTHER PUBLICATIONS

Umeda, K., et al., Registration of Range and Color Images Using Gradient Constraints and Ran Intensity Images, Proceedings of the 17th International Conference onPatern Recognition (ICPR'04), Copyright 2010 IEEE. [Retrieved online Jan. 28, 2010—IEEE.
Williams, J.A., et al., Evaluation of a Novel Multiple Point Set Registration Algorithm, Copyright 2000, [Retrieved on Jan. 18, 2010 at 04:10 from IEEE Xplore], pp. 1006-1010.
Willoughby, P., "Elastically Averaged Precisoin Alignment", In: "Doctoral Thesis", Jun. 1, 2005, Massachusetts Institute of Technology, XP55005620, abstract 1.1 Motivation, Chapter 3, Chapter 6.
Yan, R., et al, "3D Point Cloud Map Construction Based on Line Segments with Two Mutually Perpendicular Laser Sensors", 2013 13th International Conference on Control, Automation and Systems (ICCAS 2013), IEEE, Oct. 20, 2013, pp. 1114-1116.
Ye, C. et al., "Characterization of a 2-D Laser Scanner for Mobile Robot Obstacle Negotiation" Proceedings / 2002 IEEE International Conference on Robotics and Automation, May 11-15, 2002, Washington, D.C., May 1, 2002, pp. 2512-2518, XP009169742.

\* cited by examiner

3-D MEASURING DEVICE WITH BATTERY PACK

CROSS REFERENCE TO RELATED APPLICATIONS

The present application claims priority to German Patent Application 10 2015 122 844.0 filed Dec. 27, 2015, the contents of which are incorporated herein in their entirety.

BACKGROUND

German patent application DE 10 2009 055 988 B3 discloses a known 3D measurement device, designed as a laser scanner. A measuring head which is rotatable relative to a base about a first axis emits an emitted light beam by means of a light emitter and a mirror which is rotatable relative to the measuring head about a second axis, and receives, by means of the mirror and a light receiver, a reception light beam reflected or otherwise scattered by an object in the environment of the laser scanner. A control and evaluation device determines at least the distance from the object for each of a plurality of measuring points. The angular position sensors assigned to the two axes supply the related angles. With this method, the 3D coordinates of the measuring points can be determined, based on an initial initialization. The rotor that supports the mirror is balanced by a variety of recesses. A color camera integrated into the measuring head supplies 2D color images. In EP 2 005 112 B1, a line camera is mounted at the top of the measuring head.

German patent application DE 10 2009 015 922 A1 discloses a known method in which a scene is registered using multiple scans. To accomplish this, after generating one scan, the laser scanner is moved to a new location to generate another scan. The measuring points of the generated scans are registered in a common system of coordinates, and the measuring points together form a three-dimensional point cloud.

BRIEF DESCRIPTION

According to one aspect of the disclosure a 3D measurement device for optically scanning and measuring an environment is provided. The device includes a measuring head having a light emitter which emits an emission light beam, a light receiver and a control and evaluation device. The light receiver receives a reception light beam that is reflected or otherwise scattered by an object in the environment of the 3D measurement device. The control and evaluation device determines at least the distance from the object for each of a plurality of measuring points. A battery pack is removably coupled to the measuring head. The battery pack includes a battery housing and a plurality of individual batteries that are circular in cross-section. The plurality of individual batteries are arranged in a plurality of rows that define a row direction, wherein adjacent rows extend in the row direction. The plurality of rows include a first row offset from a second row by one-half a diameter of the individual batteries.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

Figure 1:
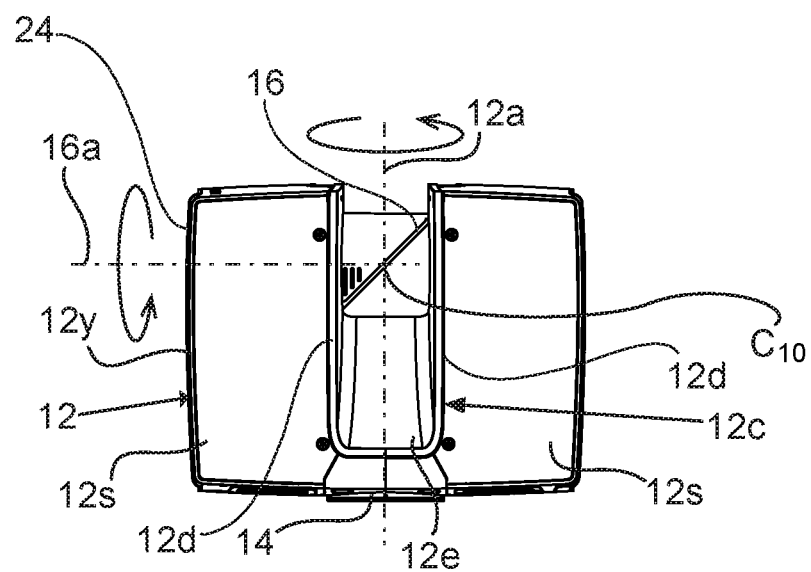
FIG. 1 a side view of an example of a 3D measurement device.

The detailed description explains embodiments of the disclosure, together with advantages and features, by way of example with reference to the drawings.

DETAILED DESCRIPTION

Embodiments of the present invention provide for an improved 3D measurement device. Some embodiment provide advantages that are achieved according to embodiments of the invention by a device having the features of claim 1. Advantageous embodiments are the subject matter of the dependent claims.

Rectangular rechargeable batteries are routinely used as a power supply for portable data processing or telecommunications devices, tools or other cordless devices. Battery packs that contain individual batteries from mass produced series are used when sufficient installation space or the voltage to be delivered can be achieved using a small number of individual cells. Although the individual batteries are often held together by a film, users can replace these individual batteries on their own as needed.

The use of a battery pack according to embodiments of the invention exploits the advantage of sourcing from mass produced series and of simplified replacement, while offsetting the apparent disadvantage of the amount of installation space required by packing the batteries as tightly as possible. The tightest possible packing of elongated bodies that have a circular cross-section is in offset rows. The battery housing holds the individual batteries together.

Offsetting adjacent rows by one-half the battery diameter results in open corners or gaps at the end faces. To give the battery housing the fewest possible concave regions, and to make use of these gaps, it is useful to arrange other components of the battery pack in these areas, in particular the battery contact, the protection circuit and the lock for locking the battery pack inside the measuring head. In an embodiment, the locks of the locking mechanism are multifunctional, forming the retaining elements for inserting and for removing the unlocked battery pack. Their function is changed by sliding the lock.

Multiple means for inserting the battery pack in a rotation-proof manner are provided. In addition to the dimensions of the battery housing and the eccentric arrangement of the battery contact, indentations and protrusions that cooperate with matching means on the receiving shaft may be provided on the battery housing. If the battery pack is inserted in a rotated position, the means are deployed early enough to protect the battery contact from damage.

A charging cradle for the battery pack is matched to the position of the battery contact and the means for rotation-proof insertion of the battery pack. The latter means may also be used to immobilize the battery pack on the charging cradle.

Referring now to the FIGS., embodiments of the present invention relate to a 3D (coordinate) measurement device which directs a beam of light onto an object O, which may be either a (cooperative) target, such as a reflector, or a non-cooperative target, for example a diffusely scattering surface of the object O. A distance meter in the 3D measurement device measures the distance to the object O (i.e., the distance d between the 3D measurement device and the object O), and angular position sensors measure the angular positions of two axes in the device. The measured distance and the two angles enable a processor in the device to determine the 3D coordinates of the object O. In the present case, the 3D measurement device in question is a laser scanner 10, however it will be obvious to a person skilled in the art that this can be extended to include a laser tracker or a total station. Such a device may also be used in cases in which the 3D measurement device is used for measuring distance using projector-camera assemblies, triangulation, epipolar geometry or strip geometries.

Laser scanners are typically used for scanning closed or open spaces such as building interiors, industrial facilities and tunnels. Laser scanners are used for many purposes, including building information modeling (BIM), industrial analyses, accident reconstruction applications, archaeological studies and forensic investigations. A laser scanner can be used for optically detecting and measuring objects in the environment of the laser scanner by registering data points that represent objects within the environment. Such data points are obtained by directing a light beam onto the objects and collecting the reflected or scattered light to determine the distance, two angles (i.e., an azimuthal angle and a zenith angle), and optionally a gray scale value. These raw scan data are collected, stored and sent to one or more computers to generate a three-dimensional image that represents the scanned area or the scanned object. To generate the image, at least three values are collected for each data point. These three values may comprise the distance and two angles, or may be converted values, such as x, y, z coordinates.

Figure 2:
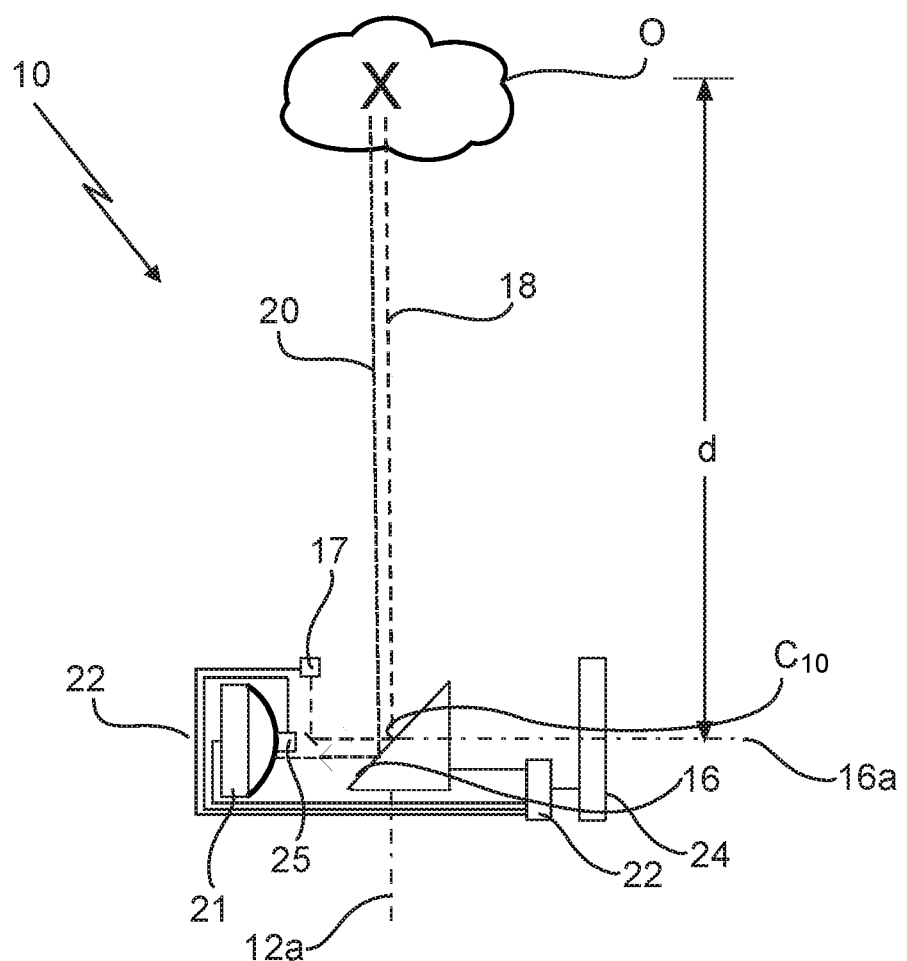
FIG. 2 a schematic representation of the beam path, including a number of optical and electronic components.
Figure 3:
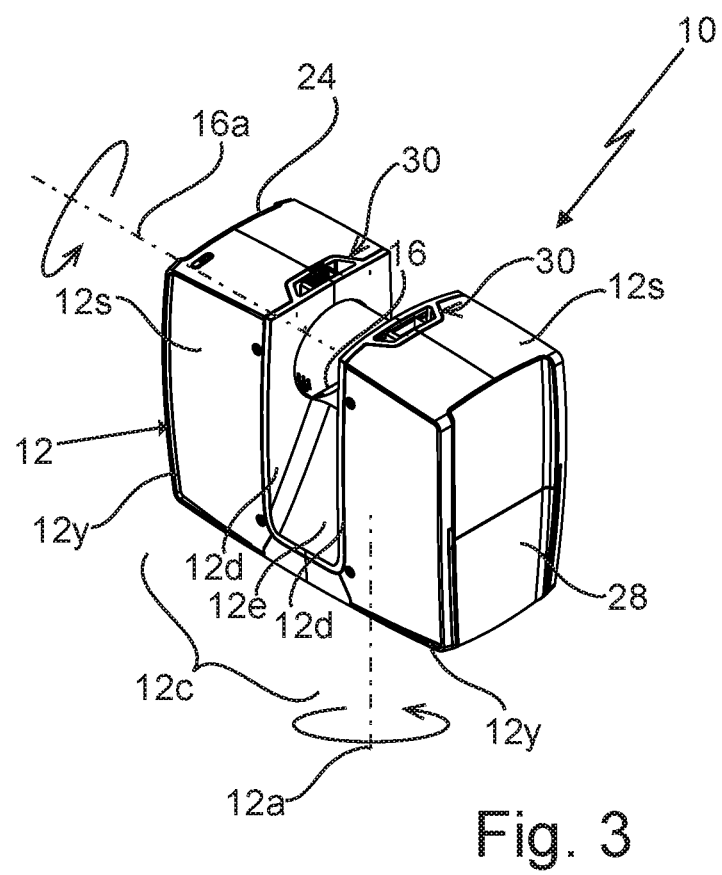
FIG. 3 a perspective view of the 3D measurement device.
Figure 4:
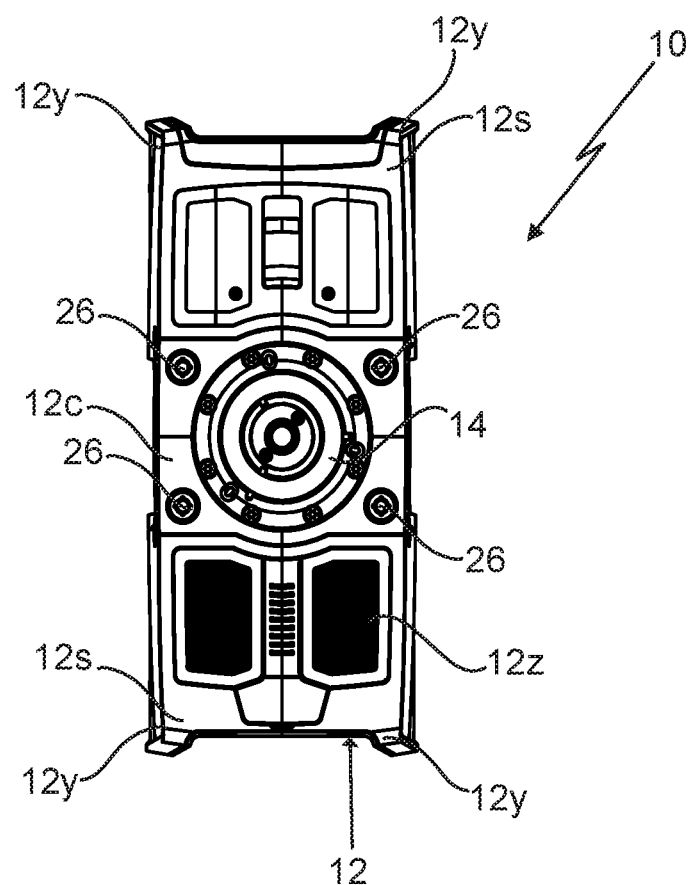
FIG. 4 a view from the bottom of the 3D measurement device.
Figure 5:
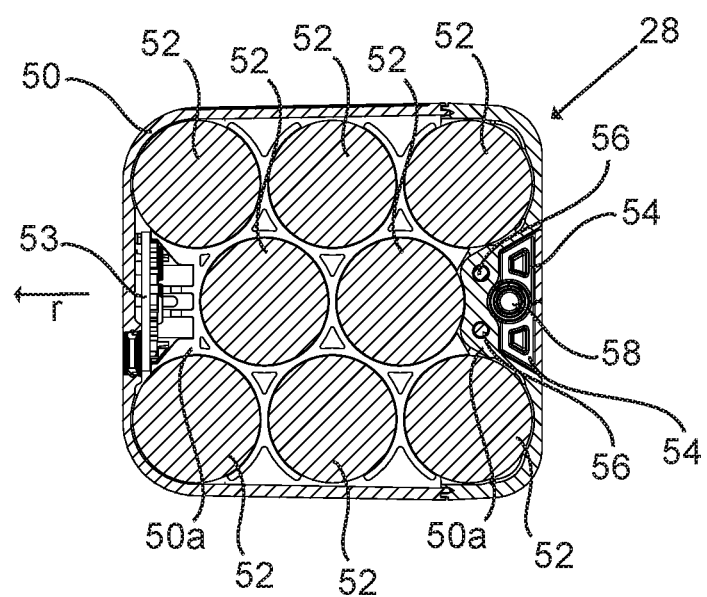
FIG. 5 a vertical cross-section of a battery pack.
Figure 6:
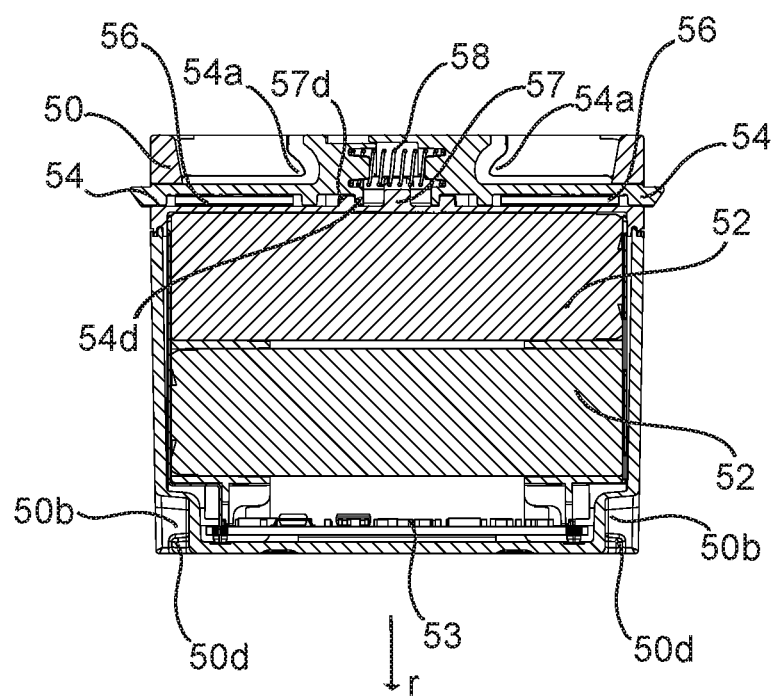
FIG. 6 a horizontal cross-section of the battery pack.
Figure 7:
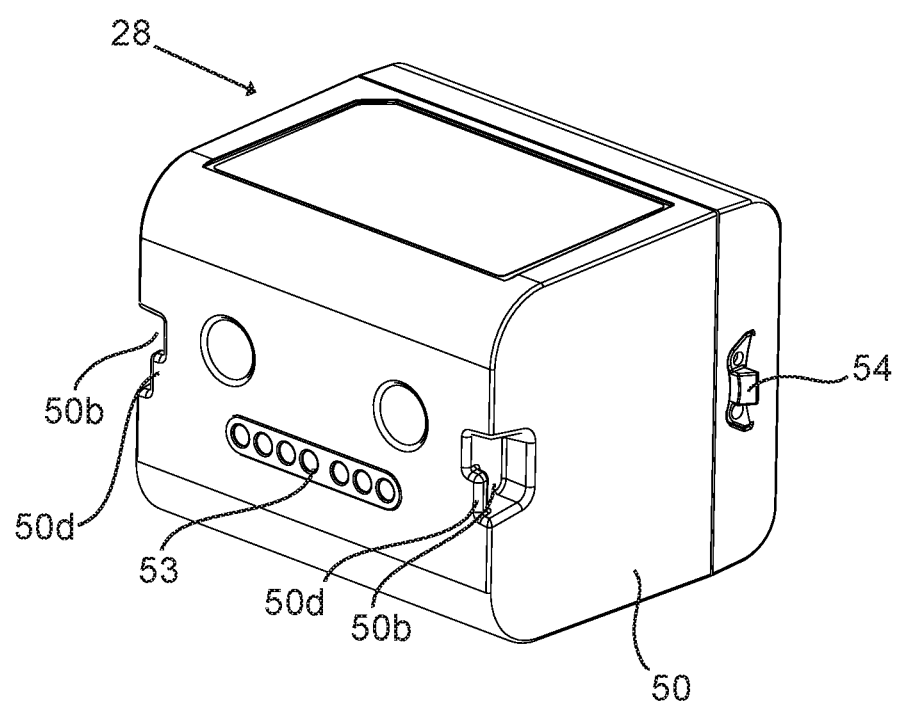
FIG. 7 a perspective view of the inner side of the battery pack.
Figure 8:
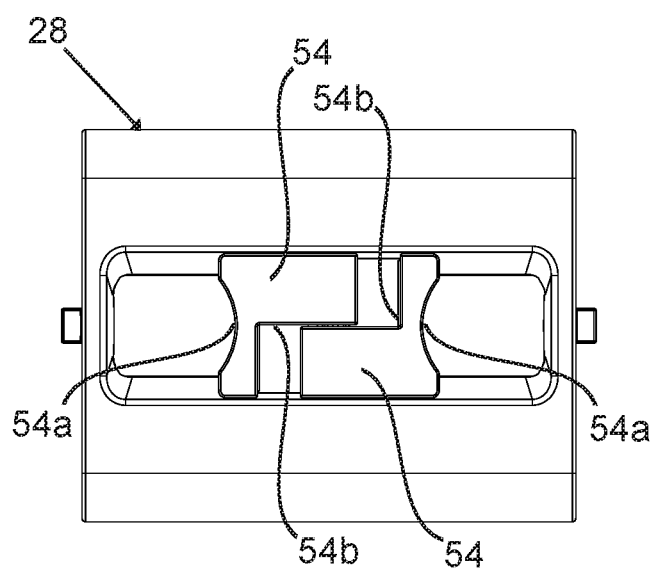
FIG. 8 a side view of the outer side of the battery pack.
Figure 9:
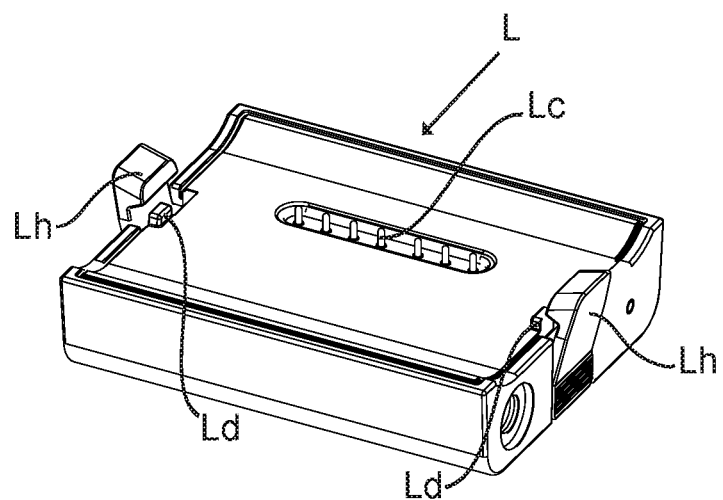
FIG. 9 a perspective view of a charging cradle for the battery pack.

Referring to FIGS. 1-3, a laser scanner 10 is shown for optically scanning and measuring the environment of laser scanner 10. Laser scanner 10 has a measuring head 12 and a base 14. Measuring head 12 is mounted on base 14 such that measuring head 12 can be rotated about a first axis 12a relative to base 14, driven by a first rotary drive. This rotation about the first axis 12a can take place around the center of base 14. Measuring head 12 has a mirror 16, which can rotate about a second axis 16a, driven by a second rotary drive. With respect to a normal, upright (with respect to the gravitational direction) position of laser scanner 10, the first axis 12a can be designated as the vertical axis, or azimuthal axis, and the second axis 16a can be designated as the horizontal axis or zenith axis. Laser scanner 10 can have a cardan point or center $C_{10}$ which is the point of intersection of the first axis 12a and the second axis 16a. The first axis 12a defines the terms "top" and "bottom", even when the axis is inclined relative to the gravitational direction.

In the exemplary embodiment, measuring head 12 has a support structure 12c in the form of a rigid supporting structure to which all other components of measuring head 12 are at least indirectly attached, and may be an integral component made of metal, for example by aluminum die casting. Support structure 12c has two walls 12d, which are parallel to one another and to the first axis 12a, and has a cross-member 12e, which connects the two walls 12d in the region of their lower ends. Cross-member 12e is rotatably mounted on base 14 and holds the first rotary drive, designed for rotating measuring head 12 about first axis 12a, and the associated angular position sensor. In the upper region of walls 12d, i.e. above cross-member 12e, an open space is provided, within which mirror 16 is arranged, supported by one of the two walls 12d.

On each of two sides of support structure 12c, measuring head 12 further has a shell 12s, made from a material such as a hard plastic. Each of the two shells 12s is associated with one of the two walls 12d and secured thereto (and therefore to support structure 12c), for example by means of screws. Support structure 12c and the two shells 12s form a housing for measuring head 12. The outer edges 12y of shells 12s are those edges of shells 12s that do not rest against support structure 12c. Outer edges 12y define a volume within which measuring head 12 in its entirety is arranged. To protect measuring head 12 from damage, in an embodiment the outer edges 12y are reinforced. In the exemplary embodiment the outer edges 12y are protruding, thickened areas of material (beads) that are integral with the associated shell 12s. Alternatively, outer edges 12y may be reinforced by a separate bracket.

An upper region of shell 12s on the side of mirror 16 ("mirror-side" shell 12s) holds the second rotary drive for rotating mirror 16 about second axis 16a, along with the associated angular position sensor, and a lower region holds cooling mechanism 12z for the two rotary drives. The other shell 12s, on the side opposite mirror 16 ("receiver side" shell 12s), holds some of the optical and electronic components described in the following, along with the power supply, particularly the sensitive components that must be kept separate from the rotary drives with their electromagnetic interference fields.

Measuring head 12 has an emitter for emitting electromagnetic radiation, for example, a light emitter 17, which emits an emission light beam 18. In the exemplary embodiment, emission light beam 18 is a coherent light such as a laser beam. The laser beam may have a wavelength ranging from about 300 to 1600 nm, for example 790 nm, 905 nm, 1570 nm, or less than 400 nm. In principle, however, other electromagnetic waves having higher or lower wavelengths may be used. Emission light beam 18 may be amplitude-modulated or intensity-modulated, for example, with a sinusoidal or rectangular waveform. Alternatively, emission light beam 18 may also be modulated differently, for example by a chirp signal, or coherent receiving methods may be used. Emission light beam 18 is sent by light emitter 17 to mirror 16, where it is deflected and emitted to the environment of laser scanner 10.

A reflected light beam, hereinafter referred to as reception light beam 20, is reflected by an object O in the environment. The reflected or scattered light is captured by mirror 16 and deflected onto a light receiver 21 having reception optics. The directions of emission light beam 18 and reception light beam 20 result from the angular positions of measuring head 12 and mirror 16 about axis 12a or 16a. These angular positions are in turn dependent on the respective rotary drives. The angular position about first axis 12a is detected by a first angular position sensor. The angular position about second axis 16a is detected by a second angular position sensor. Mirror 16 is inclined 45° relative to second axis 16a. It thus deflects all incident beams by 90°, i.e., both emission light beam 18, which is incident along the second axis 16a, and reception light beam 20, which is deflected parallel to the second axis 16a toward the reception optics.

A control and evaluation device 22 is data-connected to light emitter 17 and to light receiver 21 in measuring head 12. Since control and evaluation device 22 is a less sensitive component than light receiver 21, it may be located in various places in measuring head 12. In the exemplary embodiment, it is located for the most part within the mirror-side shell 12s. Parts of control and evaluation device 22 may also be arranged outside of measuring head 12, for example as a computer connected to base 14. Control and evaluation device 22 is designed to determine, for a plurality of measuring points X, a corresponding number of distances d between laser scanner 10 and measuring points X on object O. The distance from a specific measuring point X is determined at least in part by the speed of light in the air through which the electromagnetic radiation is propagated from the device to measuring point X. In the exemplary embodiment, the phase shift in the modulated light beam 18, 20, which is sent to the measuring point X and received from there, is determined and is evaluated to obtain a measured distance d.

The speed of light in air is dependent on the characteristics of the air such as air temperature, air pressure, relative humidity and carbon dioxide concentration. These air characteristics influence the refraction index of the air. The speed of light in air is equal to the speed of light in a vacuum divided by the refraction index. A laser scanner of the type described herein is based on the light propagation time in air (the propagation time required for light to travel from the device up to the object and back to the device). A method for distance measurement based on the light propagation time (or the propagation time of another type of electromagnetic radiation) is dependent on the speed of light in air and is therefore easily distinguishable from distance measurement methods based on triangulation. In methods based on triangulation, light is emitted by its light source in a certain direction, and is then collected on a camera pixel in a certain direction. Since the distance between the camera and the projector is known, and since a projected angle is compared with a receiving angle, the triangulation method allows the distance from the object to be determined based on a known length and two known angles of a triangle. The triangulation method thus is not dependent directly on the speed of light in air.

In an embodiment, the measuring head 12 has a pointing and display device 24, which is integrated into laser scanner 10. Pointing and display device 24 may be equipped with a user interface, for example, which allows the operator to supply laser scanner 10 with measurement instructions, in particular to define the parameters or to start the operation of laser scanner 10, and pointing and display device 24 may also display measurement results—in addition to parameters. In the embodiment example, pointing and display device 24 is located on the end face of mirror-side shell 12s, and its user interface is designed as a graphic touch screen.

In addition to detecting distance d from center $C_{10}$ to a measuring point X, laser scanner 10 can also detect a gray scale value with respect to the received optical power. The gray scale value can be determined, for example, by integrating the bandpass-filtered and amplified signal in the light receiver 21 over a measurement period assigned to measuring points X. In an embodiment, a color camera 25 may be used for generating color images. Using these color images, colors (R, G, B) may also be assigned as additional values to measuring points X.

One operating mode of laser scanner 10 is referred to as the "sphere mode," where the environment around laser scanner 10 is scanned by rapidly rotating mirror 16 around second axis 16a while measuring head 12 rotates slowly around first axis 12a. In one embodiment example, mirror 16 rotates at a maximum speed of 5820 revolutions per minute. A scan is defined as the totality of measuring points X in such a measurement. For such a scan, center $C_{10}$ defines the origin of the local stationary reference system. Base 14 rests in this local stationary reference system. In sphere mode, the scan corresponds to a spherical point cloud, apart from the area which is shaded by cross-member 12e.

Another operating mode of laser scanner 10 is referred to as the "helix" mode, where the mirror 16 rotates about second axis 16a, while measuring head 12 remains stationary relative to base 14. Laser scanner 10 is mounted on a carriage, for example, which moves when laser scanner 10 is in use. In helix mode, the scan has a helical shape. Measuring head 12 may have an immobilization means 26 for immobilizing measuring head 12 on the carriage, optionally provided on base 14 or some other support that supports both base 14 and measuring head 12. Immobilization means 26 bridge the bearing between measuring head 12 and base 14, thereby protecting against damage. The immobilization means may also make it unnecessary to immobilize base 14 on the carriage (which would also be advantageous in terms of redundancies), i.e. laser scanner 10 as a whole is immobilized on the carriage simply via immobilization means 26. In this embodiment, immobilization means 26 is designed as threaded bores, via which measuring head 12 can be screw connected to the carriage or other support.

Light emitter 17, light receiver 21 and the associated optics are arranged in an upper region of the receiver-side shell 12s of measuring head 12. In the lower region of this receiver-side shell 12s, a battery pack 28 which serves as the power supply for laser scanner 10 is arranged, such as behind a protective cover, which can be at least partially removed from shell 12s. The protective cover may be a pivotable protective lid. In the exemplary embodiment, the battery pack 28 is replaceable (e.g. removable) and rechargeable.

Battery pack 28 can be inserted as a unit into measuring head 12 and removed therefrom as a unit. For this purpose, measuring head 12 has an appropriate receiving shaft in the shell 12s arranged on that side. Battery pack 28 has a battery housing 50, which may be composed of two joined parts. A plurality of individual batteries 52 having a circular cross-section, i.e. having a longitudinal axis and a cylindrical basic shape—with the exception of the end faces with the contacts—are arranged inside battery housing 50.

The individual batteries 52 are arranged in rows. The rows are arranged parallel to one another and parallel to a row direction r defined thereby, which is in turn perpendicular to the longitudinal axis of the individual batteries 52. In the present case, row direction r is also the direction in which battery pack 28 is inserted into the receiving shaft of measuring head 12. In each row, the individual batteries 52 are arranged side by side in row direction r, spaced from their immediate neighbors by a defined minimum distance. The adjacent row is arranged offset from the first by one-half battery diameter in row direction r and at the same time is moved toward the former row, perpendicular to row direction r (and to the longitudinal axes), up to said minimum distance. The individual batteries 52 are thus packed in a close configuration (e.g. as tightly as possible). With three immediately adjacent individual batteries 52 in each case, both the longitudinal axes and the areas with a minimum distance define equilateral triangles. In the present embodiment, eight individual batteries 52 are provided in three rows, with the middle row, which is offset from the two outer rows, containing one fewer individual battery 52, or in this case, two rather than three individual batteries 52. This results in two gaps 50a at the two ends of the middle row. One gap 50a (on the inner side in measuring head 12) is used for housing battery contact 53 together with the charging electronics and protection circuit connected thereto, that is to say, the electrical connection for battery pack 28 inside measuring head 12. The other gap 50a, opposite in row direction r (on the outer side in measuring head 12) is used for holding two locks 54.

Locks 54 are used for locking battery pack 28 to the receiving shaft in shell 12s or support structure 12c of measuring head 12. The two locks 54 are identical in design and arranged opposite one another. They are slidable linearly by means of at least one guide pin 56, specifically perpendicular to the row direction and parallel to the longitudinal axes of the individual batteries 52. A fixed element 57 at the center of battery pack 28 limits the movement of each of the two locks 54 to one-half of battery pack 28, thus separating locks 54 from one another kinematically. Fixed element 57 supports guide pins 56—in the present embodiment two such pins arranged parallel and side by side. Locks 54 may be movable on guide pins 56, which are then seated immobilized in fixed element 57, or each lock 54 may be seated immobilized on one guide pin 56, with the two guide pins 56 being mounted movably in fixed element 57. Guide pins 56 and fixed element 57 form the bearing for lock 54. Fixed element 57 also introduces forces into battery housing 50 that act on locks 54.

A prestressed locking spring 58 forces the two locks 54 apart. When battery pack 28 is inserted properly into the receiving shaft, the free ends of the two locks 54 each engage into matching recesses in the receiving shaft. The prestressing of locking spring 58 holds locks 54 in the matching recesses, fixing battery pack 28 in measuring head 12.

To remove battery pack 28 from measuring head 12, locks 54 are slid toward one another against the stress of locking spring 58. Trough-shaped grip elements 54a suitable for this purpose are formed in locks 54 to allow a user to grip them using one finger each. At the ends facing one another, locks 54 each have a stepped shoulder 54b, allowing them to be moved side by side in sections in the sliding direction. Grip elements 54a can thus be moved close to one another. This allows the user to ergonomically balance the weight of battery pack 28 more easily when holding battery pack 28 between two fingers. Each grip element 54a is thus used both for sliding lock 54 and holding battery pack 28 during insertion and removal.

In an embodiment, each lock 54 has a stop 54d, such as a suitably shaped material piece of lock 54. Stop 54d cooperates with a counter-stop 57d of battery housing 50 to limit the outward movement of lock 54 based on the prestressing of locking spring 58. Stop 54d may also be that part of lock 54 which cooperates with fixed element 57 in the opposite direction to limit the movement of locks 54 toward one another. This function may also be performed by an additional stop on lock 54 together with counter stop 57d.

The dimensions of battery pack 28 may be selected such that it can be placed in only two ways on the receiving shaft of measuring head 12. To provide that battery pack 28 is inserted properly into the receiving shaft, the leading side of battery pack 28 during insertion, that is to say, the side which has battery contact 53, may be configured as rotation-proof.

In an embodiment, the battery housing 50 has two cup-shaped indentations 50b. The two indentations 50b in battery housing 50 are each formed on the edge between the side which has battery contact 53 and one of the two sides from which one of the two locks 54 protrudes. Indentations 50b are designed as asymmetrical with respect to a horizontal plane, in this case with a small housing protrusion 50d on one side forming a partial wall of indentation 50b, and a recess being provided in each case adjacent to housing protrusion 50d.

As a further protection against rotation, battery contact 53 may be arranged eccentrically. The matching female contact is then likewise arranged eccentrically in the receiving shaft. If battery pack 28 is inserted in a rotated position, it cannot be inserted fully into the receiving shaft, and particularly cannot be fixed in place. The user must then rotate battery pack 28 and reinsert it, since it can be fully inserted and fixed in place in only one precise position.

A charging cradle L for battery pack 28 is designed according to the same principle. Its receiving contact Lc is arranged eccentrically. On charging cradle L, recesses that match the housing protrusions 50d are provided, and offset laterally therefrom, charging cradle protrusions Ld are provided, which match the recesses adjacent to housing protrusions 50d. The battery pack 28 can be seated properly on charging cradle L and can be fixed in place only in one position. In this embodiment, to secure battery pack 28 in charging cradle L, the charging cradle L has a pivotable, spring-prestressed charging cradle hook Lh on each of two opposing sides. As battery pack 28 is being secured in place, charging cradle hooks Lh engage in indentations 50b of battery housing 50, thereby engaging behind housing protrusions 50d.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A 3D measurement device for optically scanning and measuring an environment, the device comprising:

a measuring head having a light emitter which emits an emission light beam, a light receiver which receives a reception light beam that is reflected or otherwise scattered by an object in the environment of the 3D measurement device, and a control and evaluation device, which determines at least the distance from the object for each of a plurality of measuring points;

a battery pack removably coupled to the measuring head, the battery pack having a battery housing, a plurality of individual batteries which are circular in cross-section and which are arranged in a plurality of rows that define a row direction, wherein adjacent rows extend the in row direction, wherein the plurality of rows includes a first row offset from a second row by one-half a diameter of the individual batteries;

at least one lock coupled to the measurement head, the at least one lock being operable to secure the battery pack in the measurement head when the battery pack is inserted into the measurement head, the at least one lock includes a trough shaped grip element arranged to allow an operator to slide the lock and hold the battery pack during insertion and removal;

a battery housing within the measurement head, the battery housing sized to receive the battery pack;

at least one battery contact electrically coupled between the battery pack and the battery housing when the battery pack is inserted into the battery housing;

wherein the plurality of rows includes a third row directly adjacent the second row opposite the first row, the second row having one less individual battery than the first row and third row; and wherein the at least one lock includes a first slidable lock and a second slidable lock, each of the first slidable lock and second slidable lock including a plurality of guide pins that are separated from each other by a fixed element and are forced apart by a locking spring.

2. The device of claim 1, further comprising means for inserting the battery pack in a non-rotating manner into a shaft of the measuring head.

3. The device of claim 2, wherein the means includes at least one of indentation in the battery housing, protrusions in the battery housing, or a position of the battery contact.

4. The device of claim 3, wherein the battery pack cooperates with a charging cradle, the charging cradle that includes at least one receiving contact that electrically couples to a battery contact of the battery pack.

5. The device of claim 4, wherein the charging cradle includes at least one of a protrusion that cooperates with the at least one indentation in the battery housing or at least one charging cradle hook that cooperates with at least one protrusion in the battery housing.

6. The device of claim 5, wherein the measuring head is rotatable relative to the base about a first axis and a mirror is provided, the mirror is rotatable relative to the measuring head about a second axis, wherein the mirror deflects the emission light beam and the reception light beam, and in that the measuring head has a support structure and at least one shell to be secured to the support structure, in which a shaft for receiving the battery pack is formed.

7. The device of claim 1, wherein the fixed element is centrally located within the battery pack and disposed to limit the movement of the first slideable lock and the second slidable lock to one-half of the battery pack and kinematically separate the lock.

8. The device of claim 7, wherein the plurality of guide pins includes two guide pins arranged in parallel and side by side.

9. The device of claim 8, further comprising a lock spring disposed between the first slidable lock and the second slidable lock, the lock spring biasing the first slidable lock and the second slidable lock apart.

* * * * *